(12) United States Patent
Banerjee et al.

(10) Patent No.: US 12,212,496 B1
(45) Date of Patent: Jan. 28, 2025

(54) FLEXIBLE DISTRIBUTION OF FLOW STATE MANAGEMENT WORKLOADS AMONG ISOLATED EXCEPTION-PATH CELLS OF PACKET PROCESSING SERVICES

(71) Applicant: Amazon Technologies, Inc., Seattle, WA (US)

(72) Inventors: Sujogya Banerjee, Kenmore, WA (US); Shine Mohamed Jabbar, San Ramon, CA (US); Mahesh Elireddy, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 18/189,157

(22) Filed: Mar. 23, 2023

(51) Int. Cl.
  *H04L 47/12* (2022.01)
  *H04L 43/08* (2022.01)
  *H04L 45/74* (2022.01)
  *H04L 69/22* (2022.01)

(52) U.S. Cl.
  CPC .............. *H04L 47/12* (2013.01); *H04L 43/08* (2013.01); *H04L 45/74* (2013.01); *H04L 69/22* (2013.01)

(58) Field of Classification Search
  CPC ......... H04L 47/12; H04L 43/08; H04L 45/74; H04L 69/22
  See application file for complete search history.

(56) References Cited

U.S. PATENT DOCUMENTS

| | | |
|---|---|---|
| 6,993,021 B1 | 1/2006 | Chuah et al. |
| 7,782,782 B1 | 8/2010 | Ferguson et al. |
| 7,865,586 B2 | 1/2011 | Cohn |
| 8,244,909 B1 | 8/2012 | Hanson et al. |
| 8,331,371 B2 | 12/2012 | Judge et al. |
| 8,358,658 B2 | 1/2013 | Flynn et al. |
| 8,478,896 B2 | 7/2013 | Ehlers |
| 8,693,470 B1 | 4/2014 | Maxwell et al. |
| 10,742,446 B2 | 8/2020 | Tillotson et al. |
| 10,757,009 B2 | 8/2020 | Deb et al. |
| 10,785,146 B2 | 9/2020 | Tillotson et al. |
| 10,797,989 B2 | 10/2020 | Tillotson et al. |
| 10,834,044 B2 | 11/2020 | Tillotson et al. |
| 10,893,004 B2 | 1/2021 | Tillotson et al. |
| 10,897,417 B2 | 1/2021 | Tillotson et al. |
| 11,310,155 B1 | 4/2022 | Qian et al. |
| 11,353,855 B1 | 6/2022 | Hahn et al. |
| 11,469,998 B2 | 10/2022 | Sanghvi |

(Continued)

OTHER PUBLICATIONS

"Albert Greenberg, et al ""VL2: A Scalable and Flexible Data Center Network"" Communications of the ACM, vol. 54, No. 3, Mar. 2011, pp. 1-10".
"Chuanxiong Guo, et al ""BCube: A High Performance, Server-centric Network Architecture for Modular Data Centers"" SIGCOMM'09 Aug. 17-21, pp. 1-12".
"On the Impact of Packet Spraying in Data Center Networks", Advait Dixit, et al., 2013, pp. 1-9.
U.S. Appl. No. 17/706,495, filed Mar. 28, 2022, Sujogya Banerjee, et al.
U.S. Appl. No. 17/706,511, filed Mar. 28, 2022, Sujogya Banerjee, et al.

(Continued)

*Primary Examiner* — Benjamin M Thieu
(74) *Attorney, Agent, or Firm* — Robert C. Kowert; Kowert, Hood, Munyon, Rankin & Goetzel, P.C.

(57) ABSTRACT

A fast-path node of a packet processing service receives a packet of a forward-direction flow. The node obtains an exception-path routing rule from an exception-path routing rule source. The node sends a query to an exception-path cell of the service based on the routing rule, and receives a packet rewriting rule in response to the query. The rewriting rule is used to send a rewritten version of the packet to a destination.

20 Claims, 17 Drawing Sheets

(56) References Cited

U.S. PATENT DOCUMENTS

| | | |
|---|---|---|
| 11,500,837 B1 | 11/2022 | Reaz et al. |
| 11,601,365 B2 | 3/2023 | Qian et al. |
| 11,665,090 B1 | 5/2023 | Banerjee et al. |
| 2008/0002579 A1* | 1/2008 | Lindholm ............... H04L 47/10 370/230 |
| 2008/0225875 A1* | 9/2008 | Wray ................. H04L 12/4633 370/419 |
| 2012/0089032 A1* | 4/2012 | Park ....................... A61B 5/361 600/484 |
| 2021/0044512 A1* | 2/2021 | Deb ........................ H04L 45/46 |
| 2022/0292184 A1* | 9/2022 | Pope .................. H04L 63/0218 |
| 2022/0321469 A1 | 10/2022 | Qian et al. |
| 2022/0321471 A1 | 10/2022 | Qian et al. |

OTHER PUBLICATIONS

U.S. Appl. No. 16/711,255, filed Dec. 11, 2019, Daniel Voinea, et al.
U.S. Appl. No. 16/843,807, filed Apr. 8, 2020, Oron Anschel, et al.
U.S. Appl. No. 17/385,778, filed Jul. 26, 2021, Meher Aditya Kumar Addepali.
U.S. Appl. No. 18/323,369, filed May 24, 2023, Abhishek Chhajer, et al.

* cited by examiner

Scenario 6A: Exception-path flow state processing done at IEC selected using IVNI-to-IEC mapping, both IVNI and EVNI mapped to same IEC Scenario 6B: Exception-path flow state processing done at IEC selected using IVNI-to-IEC mapping, IVNI and EVNI mapped to different IECs

FLEXIBLE DISTRIBUTION OF FLOW STATE MANAGEMENT WORKLOADS AMONG ISOLATED EXCEPTION-PATH CELLS OF PACKET PROCESSING SERVICES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines.

As demand for virtualization-based services at provider networks has grown, more and more networking and interconnectivity-related features have been added to the services. Many such features may require network packet address manipulation in one form or another, e.g., at level 3 or level 4 of the open systems interconnection stack. For example, some providers configure groups of resources as isolated virtual networks on behalf of respective customers, with substantial flexibility being provided to the customers with respect to the networking configuration details within their particular subsets of the provider network resources. As customers may assign IP (Internet Protocol) addresses within their isolated virtual networks independently of the addresses assigned at other isolated virtual networks, managing traffic in and out of the isolated virtual networks may require the use of address translation techniques. Using ad-hoc solutions for all the different types of packet transformation requirements may not scale in large provider networks at which the traffic associated with hundreds of thousands of virtual or physical machines may be processed concurrently.

Figure 1:
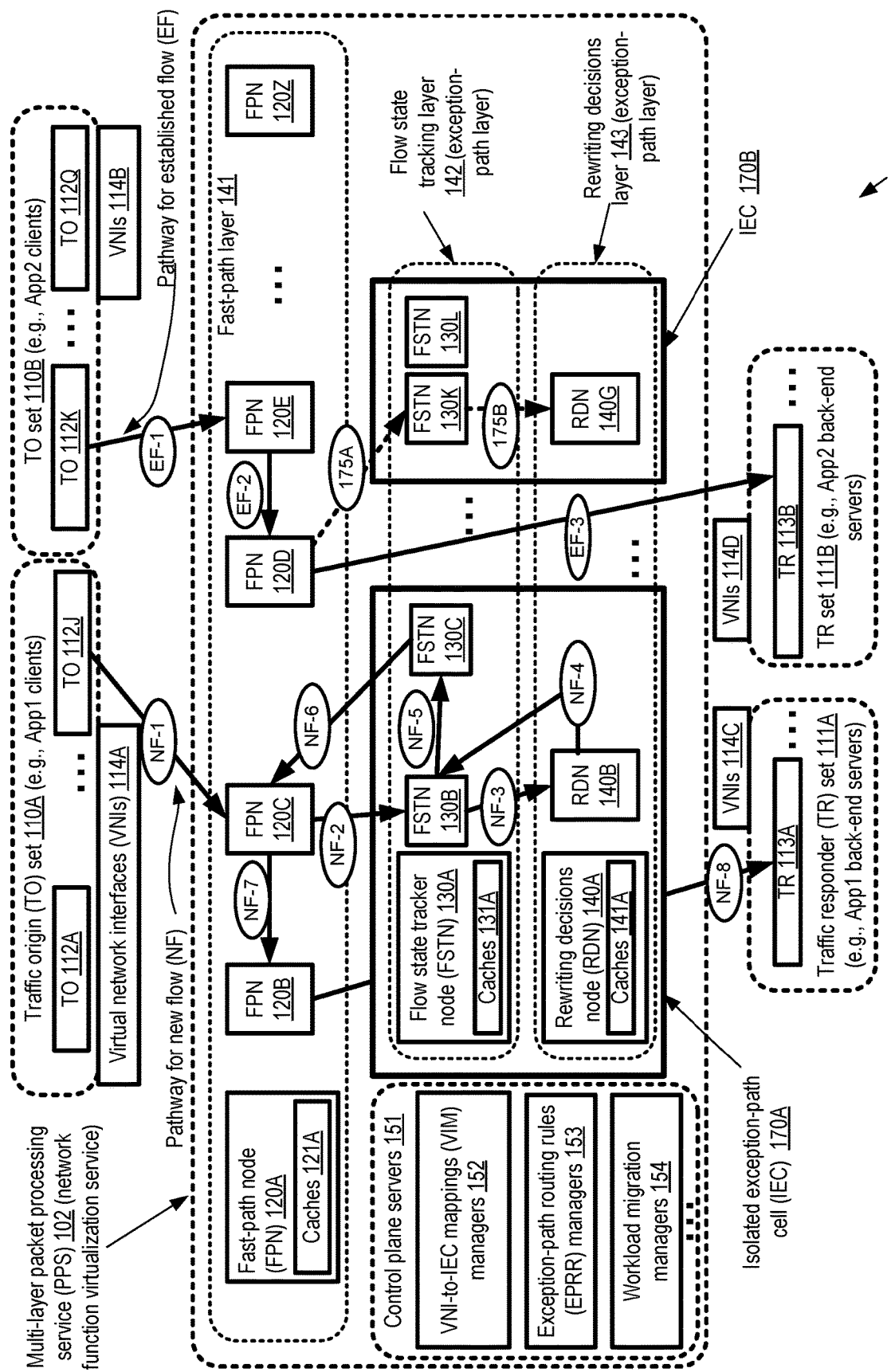
FIG. 1 illustrates an example system environment in which exception-path routing rules based on packet flow egress interfaces may be used to select isolated cells of nodes of a packet processing service for managing state information of individual packet flows, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for flexible distribution of large scale packet flow state management workloads (e.g., workloads which can collectively require the processing of millions of packets per second) among isolated cells of nodes of a multi-layer packet processing service. The flexible distribution techniques introduced can enable the packet processing service (PPS) to avoid causing application disruptions such as connection resets when mappings between packet flows and isolated cells are modified. Such mapping modifications can for example be initiated to alleviate potential bottlenecks in packet processing at isolated cells that have become overloaded or are likely to become overloaded. In addition to enabling seamless modification of the existing mappings between packet flows and cells, the techniques can also enable the PPS control plane to select initial mappings with fewer constraints (e.g., without requiring the set of flows being transmitted using multiple virtual network interfaces of given application to all be mapped to the same cell), thereby simplifying administration and onboarding of new applications, and reducing the probability of overloading of the isolated cells.

A multi-layer PPS of a cloud provider network or cloud computing environment can be used to rewrite network packets (e.g., by substituting or adding header fields) of various kinds of applications implemented at the provider network according to requirements specified by the application owners. Packet rewriting rules generated and applied by the PPS enable, for example, service requests generated by application clients to be delivered efficiently to the appropriate servers (even though the clients may not be aware of the actual network addresses of the servers in the virtualized computing environment of the cloud) and responses to the application requests to be delivered efficiently to the clients. A PPS can also be referred to as a network function virtualization service (NFVS) or a virtualized network function service (VNFS), as the packet rewriting rules are examples of virtualized network functions which can be combined into pipelines or graphs implementing various types of applications.

The packet processing service can include nodes arranged in three layers: a fast-path layer, a flow state tracking layer and a rewriting decisions layer. The flow state tracking layer and the rewriting decisions layer are collectively referred to as exception-path layers, responsible for generating packet rewriting rules based on application requirements, and for maintaining state information for various packet flows being handled at the service. The fast-path layer nodes (FPNs) can query the exception-path layer nodes (EPNs) for rewriting rules when the first packet of a flow is received, store the rewriting rules in local caches, and re-use the rules for rapidly rewriting/transforming subsequent packets of the flow before transmitting them to their intended destinations. Under normal operating conditions, an FPN can quickly use cached rewriting rules to process the vast majority of received packets of a flow, and only interacts with EPNs infrequently; hence the use of the terms "fast-path" and "exception-path" to describe the layers.

Respective groups of exception-path layer nodes of the PPS (referred to as isolated exception-path cells or IECs) can be assigned to respective applications by setting up virtual network interfaces (VNIs) for funneling traffic to/from the PPS. A VNI is a logical entity with a set of networking and security-related attributes that can be programmatically attached to (or detached from) a compute instance or networking constructs such as logical load balancers or gateways. For example, at least one IP address can be assigned to a given VNI VNI1, and security rules restricting inbound and outbound traffic may be set for VNI1. The IECs can be configured in a multi-tenant manner—that is, a given IEC can be assigned to process the packet flows of several different applications. Flow state information pertaining to a particular flow can, during default modes of operation (e.g., during time periods when workload associated with that flow is not being migrated from one IEC to another), be generated and replicated entirely within a single IEC, without requiring message to be exchanged across IEC boundaries. As such, during normal operations the EPNs of one IEC need not interact with the EPNs of any other IEC; hence the use of the term "isolated".

A given application can comprise network packets transmitted in two directions: forward-direction packets flowing from a set of connection requesters or source endpoints towards a set of destination endpoints via the PPS, and reverse-direction packets flowing from the destination endpoints (e.g., comprising response to the forward-direction packets) back to the connection requesters via the PPS. The connection requesters can for example comprise client-side programs, while the set of destination endpoints can comprise back-end application logic implementation servers. A set of VNIs referred to as "ingress" VNIs or IVNIs can be set up as intermediaries between the connection requesters of an application and the PPS. For some types of applications, a separate set of VNIs referred to as egress VNIs or EVNIs can be set up as intermediaries between the PPS and the destination endpoints; for other types of applications, a single VNI can serve as both an IVNI and an EVNI. For forward-direction flows, an Internet Protocol (IP) address assigned to an IVNI can be used as a destination address for a packet sent from a source endpoint to the PPS, while an IP address assigned to an EVNI can be used as the source address for a rewritten version of the packet sent from the PPS to a destination endpoint. For a reverse-direction flow, the IP address of the EVNI can be used as a destination address for a packet sent from a destination endpoint to the PPS, while an IP address assigned to the IVNI can be used as the source address for a rewritten version of the revers-direction packet sent from the PPS to a source endpoint. IVNIs can also be referred to as client-accessible VNIs or CVNIs.

When a networking application which is to utilize the PPS is set up, IVNIs and/or EVNIs can be chosen or configured for the application, e.g., by the control plane or administrative components of the PPS based on programmatic input from the application owners. One or more IECs can then be assigned to the application based on some combination of the VNIs set up for the application. During the default mode of operation, the nodes of a given IEC assigned to a particular packet flow of the application perform exception-path packet processing tasks for the packets of that flow, without requiring communication with other IECs, and are in this sense isolated from all the PPS nodes that are members of other IECs. Such isolation of exception-path nodes is desirable from an operational point of view in that, for example, it reduces the breadth of impact of potential failures. In the unlikely event of a failure at a given IEC, only those application and packet flows to which the IEC was assigned could potentially be affected, instead of all the applications whose traffic is being handled by the PPS. Furthermore, state information of the packet flows of a given application (including the rewriting rules being used, as well as other metadata) is replicated among a subset of nodes of the IEC assigned to the application during the default mode of operation, enabling packet flows of the application to continue without disruption even if one of the nodes of the IEC fails. The isolation of the exception-path cells also simplifies rollout of software and/or hardware updates to the IECs. In some embodiments, when establishing an IEC, a minimum and maximum number of EPNs to be assigned/allocated for the cell can be selected by the PPS control plane. During the lifetime of the IEC, the control plane can adjust the number of EPNs in the cell between the minimum and maximum as needed, independently of the number of EPNs assigned to other IECs. In some cases, different limits can be chosen for respective types of EPNs per cell-one set of limits for flow state tracking nodes (FSTNs) and another set of limits for rewriting decisions nodes (RDNs).

The PPS control plane can create a set of mappings between VNIs (being used as IVNIs or EVNIs for applications) and IECs, and propagate that set of mappings to the FPNs. The propagation of the VNI-to-IEC mappings (VIMs) enables an FPN to determine which IEC should be used as the destination of a query to obtain a rewriting rule for an initial packet of a new flow, for example. The flow state information for the new flow (including the rewriting rules for the forward and reverse direction packets associated with that flow) is replicated among multiple FSTNs according to a replication protocol (selected by the control plane) when the first packet of the forward direction is received at the PPS. This replication protocol simplifies the lookup of the rewriting rule for a reverse direction packet. In accordance with the IECs' isolation requirement, a query from an FPN to provide the rewriting rule for the reverse direction is typically directed to an FSTN in the same IEC as the FSTN to which a query for the forward direction rewriting rule was sent earlier.

In a scenario in which a given networking application uses multiple VNIs (e.g., at least one IVNI and at least one EVNI), there are in general two possibilities regarding the distribution of the VNIs among IECs. For simplicity, consider a scenario in which the application has a single IVNI IVNI and a single EVNI EVNI1 (distinct from IVNI1). If both IVNI1 and EVNI1 happen to be mapped to the same IEC IEC1 (as per the VNI-to-IEC mappings generated by the PPS control plane), IEC1 is the only IEC which could be used to replicate state information for the flows of the application. However, for balancing the workload among IECs, the PPS control plane could decide that IVNI1 is to be mapped to one IEC IEC2, while EVNI1 is to be mapped to a different IEC IEC3. In such a scenario, using IEC2 as the IEC at which state information of the flows is stored and replicated can be problematic, because the FPN which receives a reverse-direction packet of a flow would try to look up a rewriting rule for the reverse direction in IEC3 (to which EVNI1, the destination VNI of the reverse-direction packet, is mapped), but the needed flow state information would only be available within IEC2. As a result, packets of the reverse direction would be dropped in such a scenario, and end users of the application would thereby be impacted negatively.

To avoid this type of problem, a set of exception-path routing rules (EPRRs) can be created by the PPS control plane and provided (e.g., via the FSTNs, or directly by the control plane nodes) to the PPSs. An EPRR in effect comprises a mapping between a flow identifier (which in turn is based on various headers of a packet of the flow being processed, including a header which identifies the VNI whose address is used as the destination address of the packet) and an IEC at which exception-path processing for the flow is to be performed. Using such an EPRR, an FPN can determine the IEC to which a query for a packet rewriting rule (PRW) should be directed. In the above example, where IVNI1 was mapped to IEC2 and EVNI1 was mapped to IEC3, the EPRR would indicate that IEC3 is the appropriate IEC to which queries should be directed, and hence the appropriate IEC within which flow state information for the flow is generated and stored. By routing the query from a FPN to the IEC associated with the egress VNI rather than the ingress VNI, the problem of reverse-direction queries resulting in packet drops of the kind mentioned above can be avoided, without violating the isolation requirements of the IECs. If and when the PPS control plane decides to change the IEC to which an EVNI is mapped (e.g., to rebalance workload among IECs), new versions of the EPRR can be provided to the FPNs, enabling them to continue to send exception-path task requests and queries to the correct IEC.

As one skilled in the art will appreciate in light of this disclosure, certain embodiments may be capable of achieving various advantages, including some or all of the following: (a) providing desired levels of performance (such as response times and throughputs for application requests) for networking applications and services implemented using virtualized resources a cloud provider network, despite increases in application workload levels over time, and/or (b) reducing the likelihood of connection resets, packet drops, and other disruptions for cloud-based applications with very high request rates. Without using the exception-path routing rules-based techniques described herein, it may be difficult or impossible to flexibly distribute exception-path workloads among IECs without disrupting such cloud-based applications; and without being able to flexibly distribute such workloads, the performance of at least some such applications may be impacted negatively.

According to some embodiments, a system may comprise one or more control plane servers (CPSs) of a PPS of a cloud provider network, a plurality of isolated exception-path cells (IECs) of the PPS, and a plurality of fast-path nodes (FPNs) of the PPS. Individual ones of the IECs may comprise a set of exception-path nodes (EPNs) configured to store flow state flow state information and generate packet rewriting rules (PRWs). The FPNs may be configured to cache and execute the PRWs. A CPS may determine that (a) a particular ingress virtual network interface (IVNI1) is configured to receive network packets of a forward-direction flow originating at a set of traffic sources of a networking application implemented using the PPS and (b) a particular egress virtual network interface (EVNI1) is configured to send rewritten versions of the network packets of the forward-direction flow to a set of traffic destinations of the networking application. The CPS may provide, to individual ones of the FPNs, a mapping set comprising a plurality of mappings between VNIs and IECs. Such a mapping, between a particular VNI and a particular IEC may indicate that at least some configuration information associated with the particular VNI is stored at the particular IEC.

A particular FPN FPN1 of the PPS may receive a first packet P1 of a first forward-direction packet flow of the networking application. P1 may indicate that IVNI1 is the IVNI of the application in various embodiments: e.g., the destination IP address of P1 may be an address assigned to IVNI1. FPN1 may select, as a destination for a first query Q1 for an exception-path routing rule (EPRR) for the first forward-direction packet flow, a first IEC IEC1. IEC1 may be selected for Q1 based at least in part on a mapping between IVNI1 and IEC1, obtained at FPN1 from the PPS control plane in some embodiments.

In response to Q1, an EPRR EPRR1 may be obtained at FPN1 in various embodiments. EPRR1 may indicate that at least a portion of flow state information of the first forward-direction packet flow is to be stored within an IEC to which EVNI1, the EVNI of the application, is mapped.

In accordance with EPRR1, FPN1 may transmit a second query Q2 for a packet rewriting rule to a different IEC IEC2. IEC2 may be selected for Q2 in at least some embodiments based at least in part on a mapping between EVNI1 and IEC2, obtained at FPN1 from the PPS control plane. FPN1 may then receive a PRW generated at IEC2 in response to Q2 in various embodiments. PRW may indicate the manner in which incoming packets of at least the forward-direction packet flow are to be rewritten, e.g., which headers are to be modified and what the modifications are to comprise. FPN1 may cache the PRW, and transmit or forward the packet P1 to a second FPN FPN2. FPN2 may be selected as the forwarding destination based at least in part on an identifier of EVNI1 in some embodiments—that is, FPN1 may use a VNI-to-FPN mapping for EVNI1 to determine that P1 should be forwarded to FPN2. In at least some embodiments, the PRW may also be forwarded to FPN2 from FPN1. FPN2 may transmit a rewritten version of P1 to a particular destination of the set of traffic destinations in various embodiments. The rewritten version may be generated in accordance with the PRW.

A first exception-path node EPN1 of IEC2 nay receive the query Q2 from FPN1 in various embodiments. In response to receiving Q2. EPN1 may initialize a flow state information entry for the particular forward-direction packet flow. EPN1 may also cause that flow state information entry to be replicated at one or more other EPNs, including a second exception-path node EPN2, of IEC2 in various embodiments.

According to at least some embodiments, the FPNs may maintain one or more types of caches. In one embodiment, one such cache may be used to store EPRRs, while another may be used to store PRWs. The entries in the EPRR cache may be used to quickly determine which IEC should be sent queries for PRWs. For example, consider a scenario in which the network connection over which the packet P1 was received is closed, and another connection with the same combination of source and destination addresses is opened later. In such a scenario, when a packet P2 of the new connection is received, FPN1 may be able to find EPRR 1 in its EPRR cache (using for example a flow key-based lookup, where a flow key is generated based on come combination of packet flow identifier elements), and may not have to send an EPRR request query similar to Q1. The cached version of EPRR1 may then be used to request another PRW from IEC2 for the forward-direction flow to which P2 belongs in this scenario. In at least some embodiments, the EPRR cache entries may comprise respective time-to-live (TTL) values, and such TTLs may be refreshed or re-extended each time the corresponding EPRR entry is re-used. For example, every time the cache entry is accessed from the FPN's cache, its TTL may be extended for N seconds, where N is a tunable parameter of the PPS. If and when a decision is to be made to evict an entry from an EPRR cache, the entries whose TTLs have expired (or are closest to expiration) may be evicted in preference to other entries in at least some embodiments.

In various embodiments, a CPS may at some point determine that a criterion for mapping a VNI such as EVNI1 to a different IEC instead of its currently-mapped IEC has been satisfied. Such a determination may be made for any of a variety of reasons in different embodiments, e.g., based on analyzing one or more of: (a) performance metrics (such as resource utilization levels, request queue lengths, response times for responding to queries, network bandwidth usage, etc.) of one or more IECs including the currently-mapped IEC or (b) failure metrics (e.g., number of packets dropped, number of EPN restarts, etc.) of one or more IECs including the currently-mapped IEC. In response to determining that the criterion has been satisfied, the EPRRs that indicated the current mapping may be invalidated (e.g., by sending messages to the appropriate EPNs and/or FPNs) and updated EPRRs may be propagated from the CPS in at least some embodiments. The updated EPRR may indicate for example that state information of flows which were being handled earlier at IEC2 should now be handled at a different IEC IEC3.

According to one embodiment, a CPS may generate an EPRR based on programmatic input from an application owner or administrator, describing the networking application's architecture or topology, and propagate the EPRR to at least a subset of EPNs designated for the application. The EPNs may store the EPRRs in local tables or databases, and propagate them to FPNs in response to queries (such as query Q1 described above) as needed.

In some embodiments, when the first packet PR1 of a reverse-direction flow is received at FPN FPN2 (which is selected to receive PR1 based on the indication of EVNI1 as a destination of the packet), FPN2 may send a query Q3 for an EPRR applicable to PR1's flow key to the IEC IEC2 to which EVNI1 is mapped. In response to Q3, an EPN at IEC2 may discover that an EPRR applicable to PR1 is not available (since EPRRs are generated using flow keys of forward-direction flows, not flow keys of reverse-direction flows). That EPN may, however, be able to find a PRW for PR1, and send that PRW back to FPN2. In accordance with that PRW, FPN2 may forward PR1 to FPN1, and FPN1 may send a rewritten version of the packet to the traffic source from which the corresponding forward-direction flow originated.

According to some embodiments, FPNs and/or EPNs of the PPS may be implemented using compute instances or virtual machines of a virtualized computing service (VCS) of the provider network. As such, the PPS may be considered an example of software defined networking (SDN). The packet processing operations performed at the PPS may be considered examples of network function virtualization (NFV) or virtualized network functions. An encapsulation protocol (e.g., a variant of the Generic Network Virtualization Encapsulation or Geneve protocol) may be used for communication between the various types of PPS nodes in some embodiments. In various embodiments, at least some of the sources and destinations whose traffic is processes at the PPS may also or instead comprise compute instances of the VCS. In some embodiments, some or all of the sources or destinations may comprise devices external to the provider network (e.g., devices located at premises of customers of the provider network).

The PPS may provide a number of metrics to application owners or other PPS customers via programmatic interfaces (e.g., web-based consoles, command-line tools application programming interfaces (APIs), graphical user interfaces and the like) in different embodiments. Such metrics may, for example, indicate the rates at which packets are being processed, the request-response latencies for application requests, the number of IECs that are being used for the application, the number of re-mappings of VNIs to IECs that have been performed and their causes/reasons, and so on.

In at least some embodiments, at least a subset of the nodes of the PPS may be configured within the same isolated virtual network of a VCS, enabling direct node-to-node communication without having to use resources or routes across IVNs. An isolated virtual network (IVN) may comprise a collection of networked resources (including, for example, compute instances used as PPS nodes) allocated to a given VCS client such as the PPS, which are logically isolated from resources allocated for other clients in other IVNs. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. An IVN may also be referred to as a virtual private cloud (VPC) in some embodiments.

In at least some embodiments, as indicated above, a PPS and/or a VCS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be utilized for implementing nodes of a PPS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the PPS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In some embodiments, resources of the cloud provider network may be used to run software containers on behalf of clients. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. The orchestration of such containerized applications may be conducted by a container management service or a container orchestration service of the provider network.

The traffic and operations of the cloud provider network (or individual services of the cloud provider network) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which exception-path routing rules based on packet flow egress interfaces may be used to select isolated cells of nodes of a packet processing service for managing state information of individual packet flows, according to at least some embodiments. As shown, system 100 includes respective collections or pools of nodes of a fast-path layer 141, a flow state tracking layer 142, and a rewriting decisions layer 143 of a multi-layer PPS 102. The flow state tracking layer and the rewriting decisions layers are collectively referred to as exception-path layers, and the nodes of the exception path layers are organized into a set of isolated exception-path cells (IECs), such as IEC170A and IEC 170B. IEC 170A comprises flow state tracker nodes (FSTNs) 130A, 130B and 130C, as well as rewriting decisions nodes (RDNs) 140A and 140B in the depicted embodiment, while IEC 170B comprises FSTNs 130K and 130L and RDB 140G. Data packets of a given packet flow of an application, associated with one or more virtual network interfaces (VNIs) used for ingress (inbound packets from the perspective of the PPS) and egress (outbound, rewritten versions of the packets, e.g., sent from the PPS to a destination), may typically be processed at a single IEC during normal or default modes of operation (when migration workflows for IEC workloads are not underway), without communications between IECs. Fast-path layer 141 comprises a plurality of fast-path nodes (FPNs) 120A-120Z. In general, any desired number of nodes may be instantiated at any of the layers or tiers of the PPS. In the embodiment depicted in FIG. 1, each of the PPS nodes at the different layers may maintain one or more caches, such as a cache containing packet rewriting rules (PRWs) to be applied to packets of different flows to transform the packets such as caches 121A of FPN 120A, caches 131A of FSTN 130A, and caches 141A of RDN 140A. The cached information may enable faster processing of packet flows at the different layers. In some embodiments, at least some nodes at one or more of the layers may not maintain such caches. In at least one embodiment, a cache for storing exception-path routing rules (EPPRs), generated by EPRR managers 153 of the control plane servers 151, may be maintained at an FPN, as discussed in greater detail below. EPRRs and/or PRWs (generated by the control plane servers based on PPS customer application requirements) may be stored in tables maintained at some subset or all of the EPNs in various embodiments.

The different layers 141, 142 and 143 may collectively be responsible for implementing a variety of packet rewriting rules or directives on behalf of numerous clients, with each such directive being applicable to one or more flows comprising respective pluralities of packets. From the perspective of the PPS, a packet flow may comprise some number of inbound packets (packets received at the PPS, also referred to as ingress packets) and a corresponding set of outbound packets (rewritten packets sent from the PPS, referred to as egress packets, after application-specific rules have been applied to the inbound packets). A given rewriting rule (also referred to as a rewriting directive) may for example contain or indicate one or more specific parameters or algorithms to be used to generate values for outbound packet headers which differ from the values of corresponding inbound packet headers, to generate multiple outbound rewritten packets corresponding to a single inbound packet, and so on. In the depicted embodiment, one packet flow may be distinguished from another based on some combination of the following attributes: the network protocol used at least for the packets received at the PPS, the source and destination addresses, the source and destination ports, an identifier of a virtual network interface used for transmitting or receiving the packets, and/or the direction in which the packets are transmitted with respect to an application on whose behalf the packets are to be processed. For example, one or more rewriting rules may be generated and enforced in the depicted embodiment for packets originating at traffic origin set 110A (e.g., including traffic origins (TOs) 112A and 112J) and directed towards a traffic responder set 111A (e.g., traffic responder (TR) 113A). Similarly, a different rewriting rule may be implemented (e.g., concurrently with the rewriting rules being used for TO set 111A) for traffic originating at TO set 110B, such as TOs 112K and 112Q, and directed to traffic responder set 111B. A traffic responder set 111 may, for example, comprise a set of back-end servers implementing a particular application (e.g., application App1 in the case of TR set 111A, and application App2 in the case of TR set 111B) using some set of resources of a provider network, and the traffic origins may represent client devices from which requests for that application are sent. An entity responsible for the application (e.g., a customer or client of a provider network at which the PPS is implemented) may submit a request indicating a particular type of packet processing requirement (e.g., a multicast requirement, an anycast requirement, a load balancing requirement, a source address substitution requirement, or the like) to the PPS 102, and one or more packet rewriting rules to fulfill the requirement may accordingly be generated by control plane servers 151 for corresponding flows of received packets.

In some embodiments, respective packet rewriting rules may be generated for both directions of traffic flow between two sets of endpoints: e.g., one rule may be applied for packets originating at a traffic originator set 110 and directed towards a traffic responder set 111, and another rule may be applied for packets flowing from the responders back to the originators. In other embodiments, a given rewriting rule may contain respective elements or sub-rules for each direction of traffic. It is noted that in situations in which packets in both directions are transformed by the PPS, the roles of traffic "origins" and "responders" may be switched depending on the direction—e.g., when an entity or device receives a transformed packet from the PPS in the role of a responder, that same entity may subsequently send a packet to the PPS in the role of a traffic origin. In one embodiment, at least some of the PPS nodes used for packets transmitted in one direction (e.g., from a first set of hosts to a second set of hosts) may differ from the PPS nodes used for packets transmitted in the reverse direction (from the second set of hosts to the first set of hosts). For example, at least one node of the fast-path layer, the flow state tracking layer and/or the rewriting decisions layer which participates in the process of transforming and routing packets flowing in one direction may not necessarily be used for packets flowing in the reverse direction. In some embodiments, at least at one of the PPS layers, there may be no overlap between the respective fleets of nodes used for the different directions of traffic.

In various embodiments, FPNs such as FPN 120C may be provided a set of VNI-to-IEC mappings (VIMs), e.g. by one or more VIM managers 152 of the PPS control plane, which can be used by the FPNs to identify the particular IEC at which at least some configuration information pertaining to a given VNI and the VNI's traffic is maintained. A given VNI-to-IEC mapping for a particular VNI may be said to indicate the "home IEC" of that VNI.

Two examples of the paths that may be taken when responding to a packet received at the fast-path layer are indicated in FIG. 1 to help explain the respective functions of the different layers. The arrows labeled "NF" (indicating a pathway of a new flow), e.g., NF-1, NF-2, and the like represent the operations and messages that may result when the first packet of a particular flow (i.e., a flow for which a packet rewriting rule has not yet been obtained at an FPN) is received at the PPS. From among the FPNs 120A-120Z, a particular subset may be selected for a given client's packet processing requirement. One of the nodes from the subset (e.g., FPN 120C) may be selected for the first packet of a new packet flow originating at TO 112J and sent via a VNI 114A, as indicated by the arrow NF-1. The VNI 114A used for the flow may be termed an ingress VNI or IVNI for the flow in various embodiments. Outbound traffic of the flow may eventually be sent from the PPS via an egress VNI (EVNI) of a set of VNIs 114C assigned for traffic of traffic responder set 111A.

FPN 120C may examine its local caches, and determine that no entry applicable to the new flow exists in the caches (that is, neither a PRW applicable to the flow, nor an EPRR applicable to the flow, is available at the FPN 120C). An EPRR may then be obtained at the FPN 120C from a particular IEC (selected based on a VIM for the IVNI of the flow). The steps of sending a query for an EPRR and receiving the EPRR are not shown in FIG. 1 to avoid clutter. The EPRR may indicate that flow state information for packets which were directed to the PPS via the ingress VNI 114A is to be generated and stored at an IEC (in this example, IEC 170A) to which the egress VNI 114C of the flow is mapped. FPN 120C may then identify a particular FSTN 130B of IEC 170A to which a query indicating a cache miss is to be sent, as indicated by arrow NF-2.

Within a given IEC, which may contain several FSTNs, a particular FSTN may be chosen as a destination for a query from an FPN using a flow hashing-based technique in various embodiments. The FPN to which an application packet is sent may be chosen using any of a number of techniques such as client-based partitioning, shuffle-sharding and/or flow hashing. In some embodiments, respective subsets of the pool of FPNs may be assigned for different applications.

Upon receiving the cache miss indicator query NF-2, FSTN 130B may discover that it too does not have any indication of a PRW for the new flow, and may send a request for a PRW (e.g., the equivalent of its own cache miss) to a selected RDN 140B, as indicated by the arrow NF-3. RDN 140B may look up the details of the client requirement associated with the new flow (e.g., in a repository of mappings between packet source/destination addresses and packet processing requirements, by querying a control plane component of the service being used to implement the targeted application at the traffic responders, or using other techniques). RDN 140B may generate or obtain one or more PRWs corresponding to the requirement. The PRWs may indicate various characteristics of the packet or packets to be generated for each received packet of the new flow—e.g., how many packets are to be transmitted for each received packet, the networking protocol to be used for the transmitted packet or packets, the destination address/port, which address and port combination is to be used if the source address information of the received packets is to be changed, and so on.

In some implementations, the newly-generated PRW may be replicated at several RDNs for high availability; such replication is not shown in FIG. 1. As indicated by arrow NF-4, the RDN 140A may transmit the PRW back to FSTN 130B, where a local copy of the directive may also be stored in at least some embodiments. In at least some embodiments, a flow state entry for the new packet flow may be created/initialized at the FSTN 130B, e.g., either upon receiving the query from the FPN 120C, or upon receiving the PRW from the RDN 140B. In various embodiments, the PRW may be replicated at multiple nodes of layer 142—e.g., FSTN 130B may cause the flow state information entry (which includes the PRW) of the new flow to be replicated at FSTN 130C. In the default or non-migration mode of operation, flow state information for the packet flows of a given application may be replicated at a plurality of FSTNs of a given IEC assigned to the application via one or more EPRRs, but may not be replicated across IEC boundaries in such embodiments. In the depicted embodiment, the PRW may be transmitted from one of the FSTNs at which it was replicated to FPN 120C (arrow NF-6), where an entry representing the PRW may be stored in one of the FPN's local caches. The received PRW may then be implemented at FPN 120C: for example, the packet that led to the cache miss may be forwarded (NF-7) to a different FPN 120B, from where a transformed version (obtained by applying the PRW) may be transmitted to a selected destination (such as TR 113A via the EVNI as indicated by NF-8). The FPN 120B may be selected as a destination for forwarding the packet from FPN 120C because of a mapping between the EVNI indicated in the PRW and FPN 120B; that is, information about the EVNI may be used to select the FPN 120B. In some embodiments, a response to the transformed packet or packets may be received at the packet transformation layer (e.g., at FPN 120B or at a different FPN to which the response packet is directed from TR 113A). If transformations are required to the response packets, they may be applied (e.g., using one or more elements of the same PRW that was generated earlier in response to the cache miss, or using a different PRW) at layer 141, and the transformed response packets may be sent on to the traffic origin TO 112J.

The second example pathway illustrated in FIG. 1 is for a packet of an established flow—i.e., a flow for which a PRW and associated flow state information has already been generated and propagated to one or more nodes of layer 141 at which the PRW is to be applied. The arrows associated with this second flow are labeled EF (pathway for established flow). As indicated by EF-1, a packet of the established flow may be transmitted from a traffic origin 112K to FPN 120E (via one of the VNIs 114B). There, a PRW for the flow may be found in a local cache; because the PRW is found, a lookup for an EPRR may not be required. In accordance with the cached PRW entry, the packet may be forwarded to a second FPN, FPN 120D in the depicted example (EF-2). One or more outbound packets corresponding to EF-1 may be generated, and send to a destination TR 113B as indicated by arrow EF-3 via a VNI 114D. If and when additional packets of the established flow are received at FPN 120E, the cached PRW may be reapplied, e.g., without further interactions with layers 142 or 143.

In at least some embodiments, the FPNs 120 may update metadata records corresponding to packets rewritten for various flows (e.g., indicating when the most recent packet of a given flow was processed as well as various other parameters discussed below in further detail) and transmit the contents of the metadata records (either in raw form, or in some compressed/aggregated form) to the FSTNs 130, as indicated by arrow 175A. Such metadata updates or refresh messages may be sent periodically in some implementations, e.g., once every K seconds, or in response to metadata update requests from layer 142. Such metadata refreshes may be among the events that trigger flow state information replications among nodes of the IEGs in some embodiments. Similarly, as indicated by arrow 175B, representations of flow state metadata records may be transmitted from layer 142 to layer 143 in at least some embodiments, and may be used at the RDNs to make various choices required for the rewriting rules (e.g., the particular port or IP address to be used as a substitute for a source port, or a particular destination server to which the transformed packets of a load-balanced flow should be sent). For example, updates flow metadata may indicate to an RDN that a particular (address, port) combination that was being used for a particular client's packet processing requirement is no longer in use because a connection has been closed, and that (address, port) pair may subsequently be used for some other packet processing requirement of the same client or another client. The metadata may also be stored as part of the flow state information and replicated in local caches at one or more layers of the PPS.

In the embodiment shown in FIG. 1, the PPS 102 may include a set of control plane servers 151, including VIM managers 152, EPRR managers 153 and workload migration managers 154. The control plane servers may monitor various health and performance metrics collected at the IEGs and the FPNs, and/or respond to programmatic requests for various administrative tasks including explicit requests from application administrators or PPS administrators to assign PPS nodes, IECs and/or VNIs to applications, initiate and orchestrate migrations of the workload of an application from one IEC to another, and so on. In the embodiment depicted in FIG. 1, the PPS 102 may implement one or more control plane programmatic interfaces (e.g., application programming interfaces (APIs), web-based consoles, command-line tools, graphical user interfaces (GUIs) and the like) which may be used by PPS customers/clients to indicate various types of packet processing requirements and/or workload migration requirements. The nodes at the various layers of the flow management service may be implemented using virtual machines (e.g., compute instances hosted at a VCS) in some embodiments, and/or as un-virtualized machines.

The control plane servers 151 may be responsible for assigning FSTNs and RDNs to IECs in some embodiments. In at least one embodiment, a control plane server may assign a VNI as an IVNI to an application, or determine that a particular VNI has been selected as the IVNI for the application, and then a VIM manager may assign a selected IEC as the "home" IEC for that IVNI and create a VIM indicating the assignment. Similarly, a control plane server may assign a VNI as an EVNI for an application, or determine that a particular VNI has been selected as the EVNI for the application, and then a VIM manager may assign a selected IEC as the "home" IEC for that EVNI and create another VIM indicating the assignment. Note that for some networking applications a given VNI may serve as both the IVNI and the EVNI in various embodiments. The VIMs may be propagated to the FPNs from the control plane in various embodiments, e.g., either directly or via EPNs. EPRRs may be created, e.g., based on programmatic input indicating customer application requirements, and propagated from EPRR managers 153 either directly or via EPNs to FPNs in different embodiments. During a default mode of operation of given IVNI/EVNI pair, nodes of a single IEC selected using an EPRR may process packets directed of that combination of VNIs without communicating with nodes of other IEGs. Furthermore, during the default mode in at least some embodiments a particular node of the selected IEC may cause flow state information of a particular packet flow of the application to be replicated at a subset of nodes of the IEC (including the particular IEC node itself). This subset of nodes may be referred to as a replication chain. As a result of such replication, a packet rewriting rule used for the flow, which is replicated as part of the flow state information, may be obtained from one of the other nodes of the chain in the event of a failure of one of the nodes.

In response to detecting that a workload migration criterion has been met for a particular IEC, a migration procedure or workflow may be initiated by a control plane server such as a workload migration manager 154 in the depicted embodiment. The criterion may for example be the reaching of a threshold resource utilization level at the nodes of an IEC during some time interval in some embodiments, the reaching of a threshold imbalance among the workloads of different IECs, and/or be based on various other metrics and factors in different embodiments. The control plane server may select a different IEC as a workload migration destination for the first IEC (the migration source IEC) in the depicted embodiment, and cause state information of the flows being handled currently by the source IEC to be replicated at the destination IEC. The state information may be replicated to the destination IEC using an algorithm that ensures that packets of the flows are not dropped in various embodiments, thereby avoiding disruption to users of the application. In at least some embodiments, when a migration decision is made, the VIMs and/or EPRRs for the traffic which as being processed at the source IEC may be updated by the VCS control plane, and the updated EPRRs/VIMs may be propagated to at least the affected set of nodes of the PPS.

Figure 2:
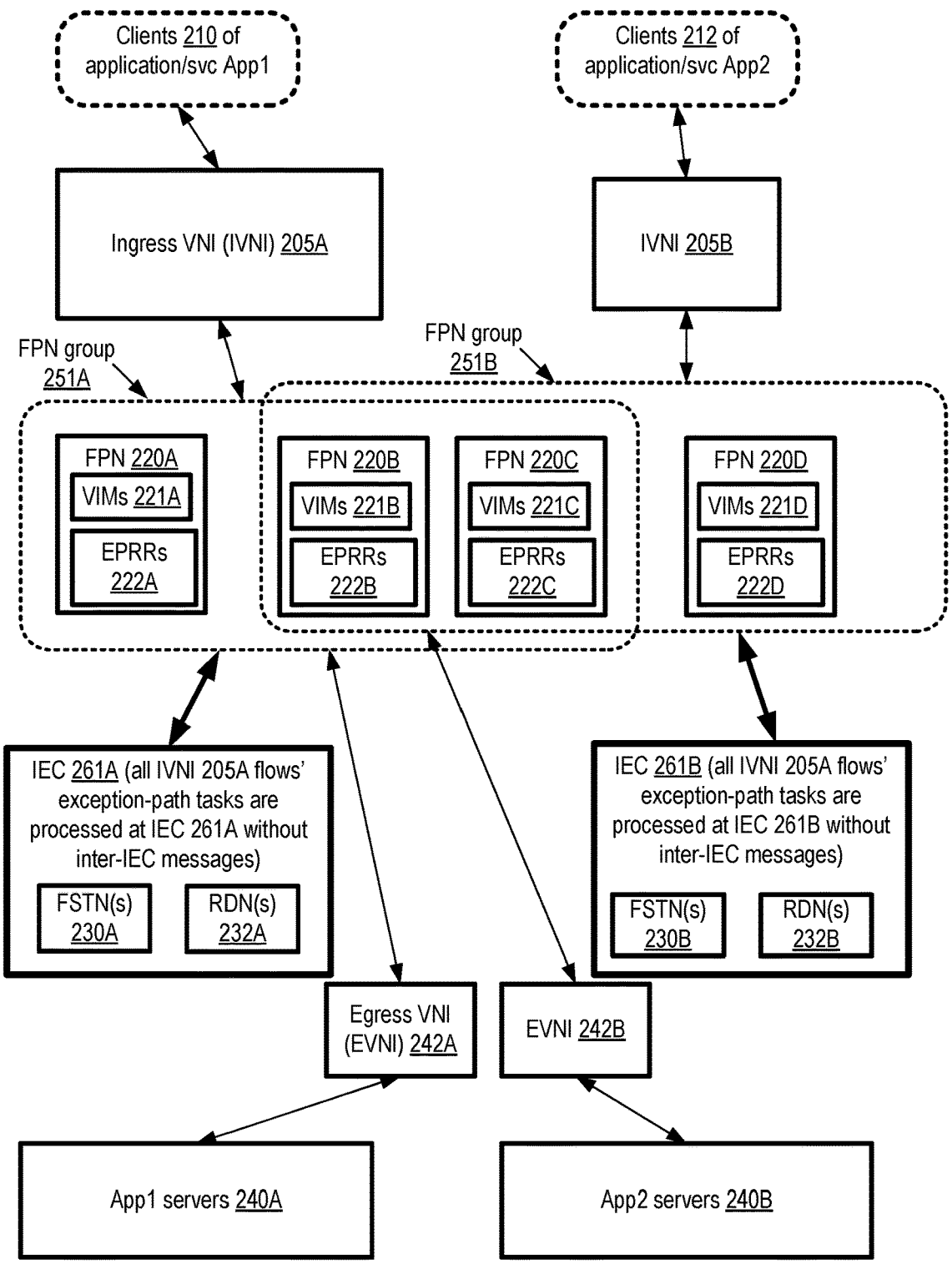
FIG. 2 illustrates an example of the use of ingress virtual network interfaces and egress virtual network interfaces for an application managed using a packet processing service, according to at least some embodiments.

FIG. 2 illustrates an example of the use of ingress virtual network interfaces and egress virtual network interfaces for an application managed using a packet processing service, according to at least some embodiments. In the embodiment depicted in FIG. 2, an IEC 261A has been selected (e.g., by the PPS control plane servers) for processing packets of an application or service App1 implemented at a set of servers 240A. IEC 261A comprises FSTN(s) 230A and RDN(s) 232A. Similarly, IEC 261B (comprising FSTN(s) 230B and RDN(s) 232B) has been assigned for processing packets of application or service App2, which is implemented at a different set of servers 240B. An ingress virtual network interface (IVNI) 205A has been configured as an endpoint for client requests of App1, which originate at clients 210, and another IVNI 205B has been configured for client requests of App2, which originate at clients 212. The descriptor "ingress" may in general be applied to a VNI whose network address is used as a destination for requests for connection establishment (with a set of traffic destinations) which are sent from a set of traffic sources to a PPS of the kind introduced above, and for subsequent requests/messages sent via the connection. The direction of traffic flow originating at the sources that requested connection establishment (clients 210 in the example shown in FIG. 2) and ending at the destinations (App1 or App2 servers in the example shown in FIG. 2) may be referred to as the "forward" direction of the traffic herein, while the direction of traffic flow from the destinations to the sources may be referred to as the "reverse" direction. A VNI whose address is used as the source address for a packet being sent from the PPS may be referred to as the "egress" VNI or EVNI. In the example shown in FIG. 2, EVNI 242A is set up for outbound traffic to App1 servers 240A from the PPS, and EVNI 242B is set up for outbound traffic to App2 servers 240B from the PPS.

A respective FPN group may be assigned to traffic received from each IVNI in the depicted embodiment. For example, FPN group 251A may be assigned to IVNI 205A, and FPN group 151B may be assigned to IVNI 205B. As shown, some FPNs may be assigned to several FPN groups—e.g., FPN group 251A may include FPNs 220A, 220B, and 220C, while FPN group 251B may comprise FPN 220B, 220C, and 220D. Thus, members of two or more FPN groups may potentially be used for processing packets of a given IVNI in the depicted embodiment. In contrast, only nodes of a single IEC may be used for processing packets received via a given IVNI during the default mode of operation of that IVNI in various embodiments. In at least some embodiments, the IECs may be configured in multi-tenant mode, in that traffic of multiple IVNIs may be processed at a given IEC. In one embodiment, multiple IVNIs may be assigned for a single application or service; each such IVNI may be assigned a respective FPN group and a respective IEC in such an embodiment.

Each of the FPNs shown in FIG. 2 may be provided VNI-to-IEC mappings (VIMs) in the depicted embodiment, e.g., by the PPS control plane servers, enabling the FPNs to identify the specific IEC whose nodes are to be used for packets of various flows (whose headers indicate the VNIs), as well as for packets flowing in the reverse direction (e.g., from App1 servers or App2 servers to clients). Thus, VIMs 221A, 221B, 221C, and 221D, are provided to FPNs 220A, 220B, 220C, and 220D respectively. In at least some embodiments, the VIMs may also be provided to FSTNs and/or RDNs by the PPS control plane.

In addition to the VNI-to-IEC mappings, the PPS control plane may also generate EPRRs of the kind introduced above in the depicted embodiment. Such EPRRs may also be propagated to the FPNs, directly or indirectly (e.g., via IECs) in various embodiments, and used by the FPNs to direct queries for PRWs to the appropriate IEC. In the scenario shown in FIG. 2, EPRRs 222A, 222B, 222C and 222D are stored or cached at FPNs 220A, 220B, 220C and 220D respectively.

Figure 3:
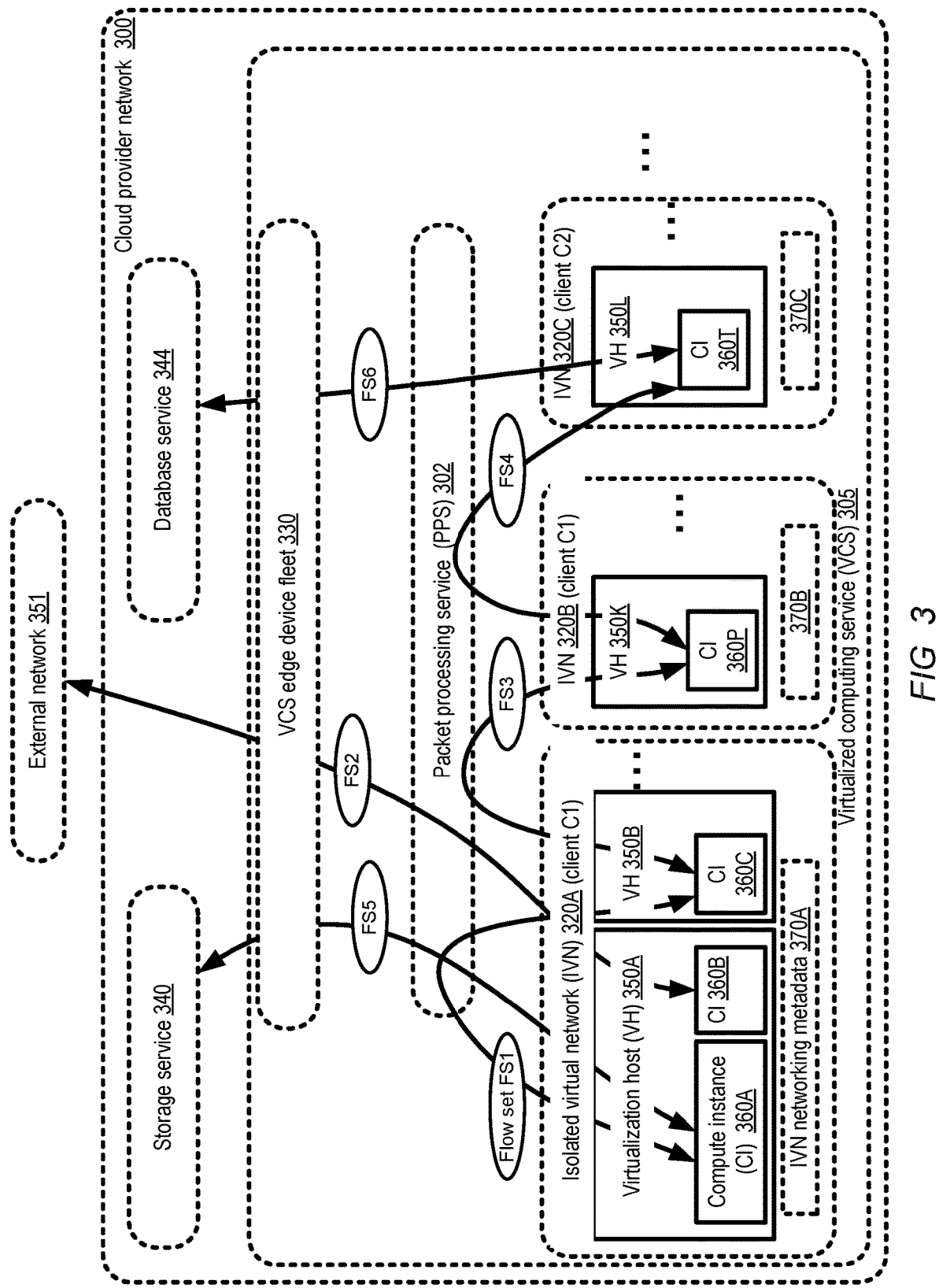
FIG. 3 illustrates examples of network flows which may originate or terminate at compute instances within isolated virtual networks of a provider network, according to at least some embodiments.

FIG. 3 illustrates examples of network flows which may originate or terminate at compute instances within isolated virtual networks of a provider network, according to at least some embodiments. Several different network-accessible services may be implemented at cloud provider network 300 of FIG. 3, including, for example, a VCS 305, a storage service 340 and a database service 344. The VCS may comprise a plurality of virtualization hosts (VHs) 350, such as 350A, 350B, 350K and 350L in the depicted embodiment, at each of which one or more compute instances (CIs) 360 such as guest virtual machines (GVMs) may be instantiated on behalf of one or more VCS clients. Each virtualization host may also include other components not shown in FIG. 3, such as a virtualization management stack (VMS) comprising a hypervisor and/or an administrative-domain operating system, with the VMS acting as an intermediary between the CIs of the host and the hardware components of the host.

In the depicted embodiment, the VCS may support the capability of setting up isolated virtual networks (IVNs) on behalf of various clients. Each IVN 320 may include a respective subset of resources of the VCS, over whose networking configuration the client is granted substantial flexibility. For example, IVN 320A (established for client C1) includes VHs 350A and 350B in the depicted embodiment, IVN 320B (also set up for client C1) includes VH 350K, and IVN 320C (set up for client C2) includes VH 350L. A given client such as C1 may establish multiple IVNs for various purposes—e.g., IVN 320A may be set up for hosting a web application for access from external networks such as network 351 (which may for example include portions of the public Internet and/or a client-owned network), while IVN 320B may be set up for the development of the web applications. Generally speaking, the VCS may allow the traffic associated with a given IVN to be isolated or separated from the traffic associated with any other IVN, unless of course the clients for whom the IVNs are established indicate otherwise. With respect to a given IVN, the client may make various networking decisions such as IP address assignment, subnet configuration and/or enforcement of security rules regarding incoming and outgoing traffic independently of the corresponding decisions made with respect to other IVNs. For example, a particular private IP address which is assigned to a CI 360B at VH 350A of IVN 320A may also happen be assigned to CI 360T at VH 350L of IVN 320C. Thus, with respect to many aspects of network management, each IVN may effectively be treated by the corresponding client as a standalone network such as one which may be established at the client's private data center. Each IVN may have an associated set of networking metadata 370 in the depicted embodiment, such as 370A for IVN 320A, 370B for IVN 320B, and 370C for IVN 370C. IVNs may also be referred to as virtual private clouds or VPCs in some environments.

In the embodiment depicted in FIG. 3, a PPS 302 similar in features and functionality to PPS 102 of FIG. 1 may be implemented at least in part for traffic originating at or directed to the CIs 360. PPS 302 may be referred to as a network function virtualization service, as the packet rewriting rules applied by it may represent virtualized network functions. The networking metadata 370 of an IVN may include addresses for the ingress and/or egress VNIs of PPS 302 for various packet processing requirements associated with the IVN in the depicted embodiment. For example, if source address substitution is to be implemented for packets originating at CIs of IVN 320A, in some embodiments a gateway for outbound traffic may be configured at IVN 320 specifically for those packets. The metadata 370A may include an indication of one or more IP addresses assigned to a VNI attached to the gateway, which may be mapped to one or more FPNs of PPS 302. Similarly, the IVN networking metadata may include indications of the interfaces and/or addresses of the VNIs of the PPS which are to be used for other types of packet processing applications, including multicast, anycast and the like.

Some types of packet transformations may be required for traffic originating and terminating within a given IVN, such as flow set FS1 which comprises packets flowing between different CIs of IVN 320A (e.g., 360A and 360C). Other types of transformations may be implemented with respect to flows (such as FS2) originating at external networks such as 350 and destined for CIs such as 360B within one or more IVNs as indicated by the arrow labeled FS2. For example, an application may be implemented at CI 360B, and client requests directed to that application may originate at various devices on the public Internet. Response to such requests may travel in the opposite direction—e.g., from CI 360B to the public Internet. Request packets as well as response packets may pass through the PPS 302 in the depicted embodiment. In at least some embodiments, a fleet of VCS edge devices 330 may be used as intermediaries between the VCS and other services or external networks 351. The VCS edge devices may be responsible for implementing an encapsulation protocol used at the VCS in some embodiments, e.g., for directing packets addressed to a particular CI 360 to a NIC (network interface card) associated with a virtualization management stack at the CI's virtualization host. The VCS edge devices and the virtualization management stacks at various virtualization hosts may both be considered examples of PPS client-side components in the depicted embodiment. In some embodiments, compute instances of the VCS may be established at data plane servers (sometimes referred to as "outpost" servers) located at premises external to the cloud provider network (e.g., customer premises), and traffic among such external compute instances and various provider network resources (e.g., resources of storage service 340, database service 344, and/or some IVNs) may also be managed using the PPS.

In some embodiments the PPS 302 may be used as a scalable and secure channel for traffic between IVNs. For example, flow set FS3 comprises packets transmitted between IVNs 320A and 320B of the same client C1 via PPS 302, while flow set FS3 comprises packets transmitted between the IVNs of two different clients (IVN 320B of client C1 and IVN 320C of client C2). The PPS may also be used for packet flows between different services of the provider network in some embodiments. For example, flow sets FS5 and FS6 between IVNs of the VCS and other services such as database service 344 or storage service 340 may be processed at PPS 302 in the depicted embodiment. It is noted that not all the CIs of the VCS may be assigned to clients of the VCS; some CIs may be used for internal purposes in various embodiments. In at least one embodiment, as mentioned earlier, some CIs may be used for the nodes at one or more layers of the PPS itself.

Figure 4:
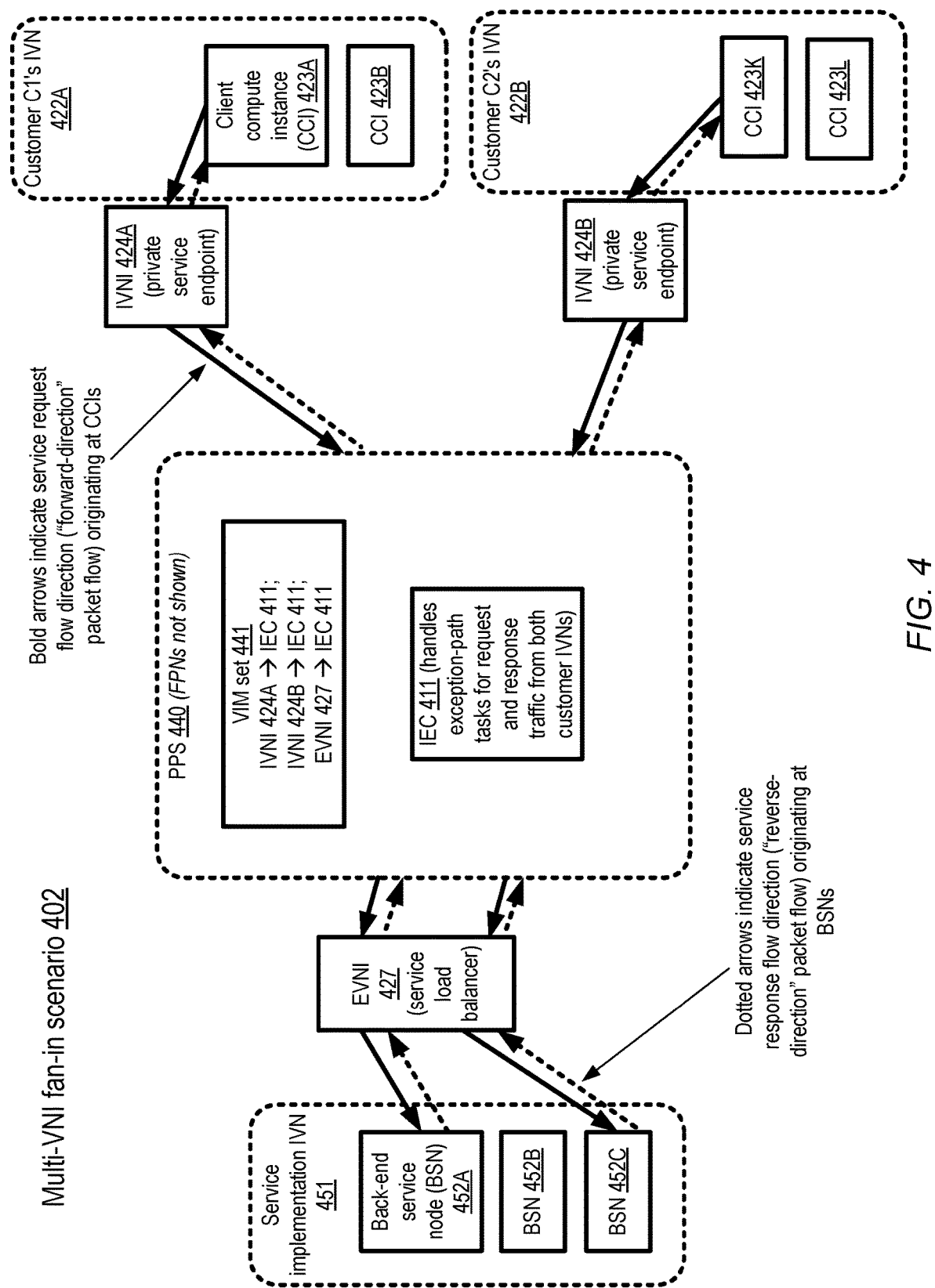
FIG. 4 illustrates an example of a networking application in which multiple ingress virtual network interfaces are used in a fan—in topology, according to at least some embodiments.

In some embodiments, multiple VNIs may be configured as ingress VNIs for a networking application, and/or multiple VNIs may be configured as egress VNIs for a networking application. FIG. 4 illustrates an example of a networking application in which multiple ingress virtual network interfaces are used in a fan—in topology, according to at least some embodiments. In multi-VNI fan—in scenario 402, service requests may be directed to a service implementation IVN 451 from numerous service customer IVNs via a PPS 440 similar in functionality to PPS 102 of FIG. 1. The term "multi-VNI fan—in" is used because multiple IVNs send service requests into the PPS via respective IVNIs. A customer C1's IVN 422A comprises client compute instance (CCI) 423A and CCI 423B. A different customer C2's IVN 422B comprises CCI 423K and CCI 423L. The service implementation IVN 451 comprises back-end service nodes (BSNs) 452A, 452 and 452C.

For each customer IVN, a respective IVNI referred to as a private service endpoint may be configured, e.g., by the PPS control plane in the depicted embodiment. IVNI 424A may be configured for IVN 422A, while IVNI 424B may be established for IVN 422B. The configuration of the IVNIs may enable service requests to be sent from private network addresses assigned within the customer IVNs to the service implementation IVN using network paths entirely within the cloud provider network as opposed to (for example) sending the requests via the public Internet. Arrows shown in bold indicate the direction in which packets comprising service requests are sent in scenario 402, while dotted arrows indicate the direction in which packets comprising service responses are sent. Programs running at the CCIs may be configured to request connections for sending the service requests, and the flows containing the service requests may therefore be referred to as "forward-direction" flows. Flows containing the service responses may be referred to as "reverse-direction" flows. EVNI 427 may be assigned or programmatically attached to a logical service load balancer implemented using the PPS, which chooses particular BSNs for handling connections and corresponding service request flows based on a load balancing algorithm.

To simplify the presentation, IVNI 424A, IVNI 424B and EVNI 427 are all mapped to a single IEC 411 by the PPS control plane in the depicted example. As such, the VIM set 441 may be propagated to the FPNs designated for the application by the PPS control plane (the FPNs are not shown). VIM set 441 shows mappings between IVNI 424A and IEC 411, IVNI 424B and IEC 411, and EVNI 427 and IEC 411. IEC 411 handles exception-path tasks, such as responding to queries for PRWs and/or EPRRs, for service request and response traffic associated with both customer IVNs.

A service request packet of a particular flow originating at CCI 423A may be sent via IVNI 424A (e.g., using an IP address assigned to IVNI 424A as the destination address of the packet) to the PPS. At the PPS, a packet rewriting rule or PRW (obtained at an FPN from IEC 411) may be applied, and EVNI 427 may be used to send the request on to a BSN 452A selected using a load balancing algorithm of the PRW. The packet received at the BSN 452A may indicate an IP address of the EVNI 427 as a source address in accordance with the PRW. A response packet may be generated at the BSN 452A, and sent to the PPS using the address of EVNI 427 as a destination address. The PPS may then rewrite the response packet and send it on to the CCI 423A.

Similarly, a service request packet of another flow originating at CCI 423K may be sent via IVNI 424B to the PPS. At the PPS, another packet rewriting rule or PRW (obtained at an FPN from IEC 411) may be applied, and EVNI 427 may be used to send the request on to a BSN 452C selected using a load balancing algorithm of the PRW. A response packet may be generated at the BSN 452C, and sent to the PPS using the address of EVNI 427 as a destination address. The PPS may then rewrite the response packet and send it on to the CCI 423K.

In some cases, the number of clients utilizing a set of back-end resources such as service implementation IVN 451 in a fan—in configuration may become quite large, and it may potentially result in overloading a given EVNI or a given IEC. In some such scenarios, additional EVNIs and/or additional IECs may be chosen to absorb some of the service workload traffic, and EPRRs of the kind introduced earlier may be employed to direct the queries from FPNs to the appropriate EPRR.

Figure 5:
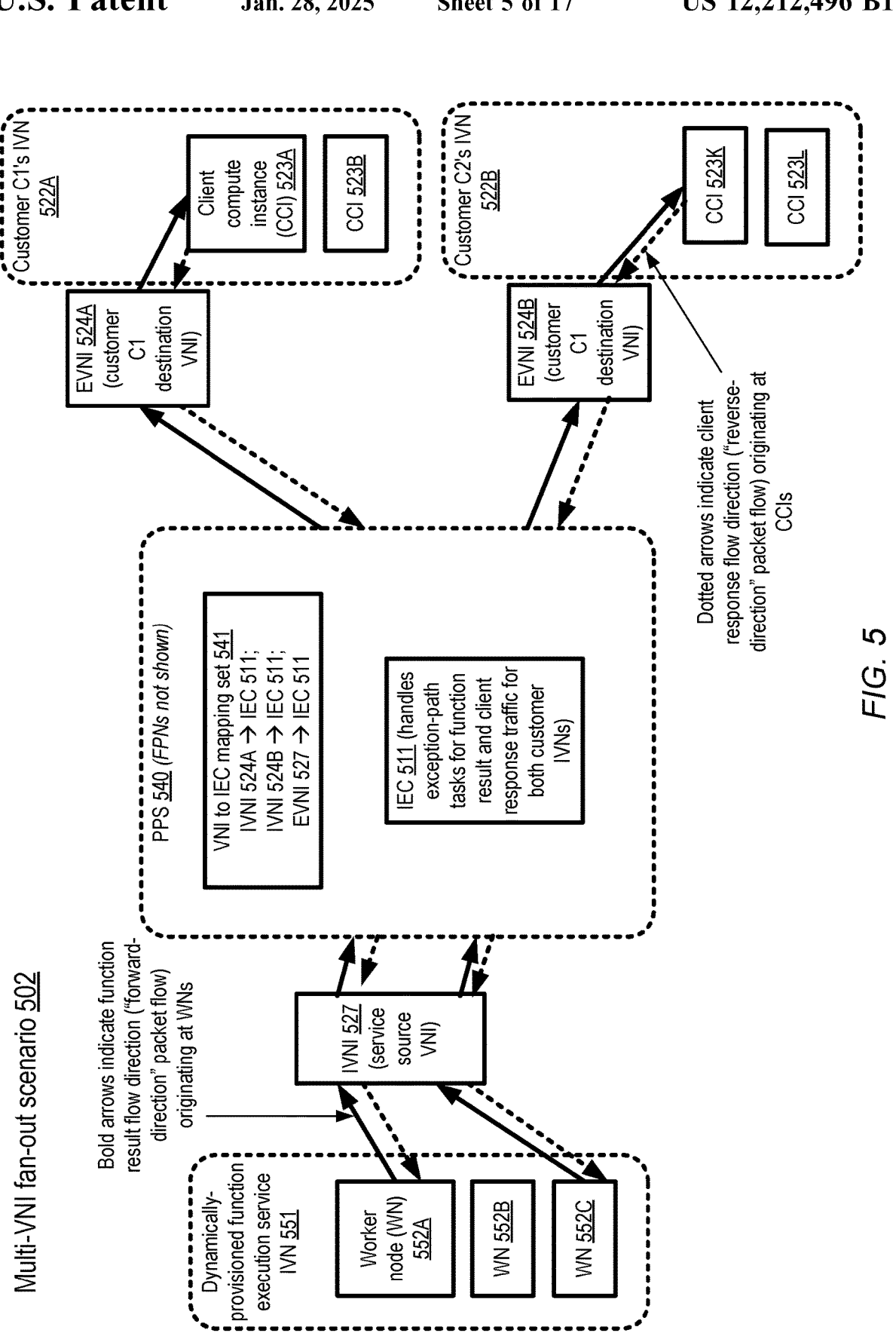
FIG. 5 illustrates an example of a networking application in which multiple egress virtual network interfaces are used in a fan-out topology, according to at least some embodiments.

FIG. 5 illustrates an example of a networking application in which multiple egress virtual network interfaces are used in a fan-out topology, according to at least some embodiments. In the multi-VNI fan-out scenario depicted in FIG. 5, there is one IVNI and multiple EVNIs, so scenario 502 may be considered a logical mirror image of the scenario depicted in FIG. 4 (in which there were multiple IVNIs and one EVNI).

In multi-VNI fan—in scenario 502, an IVN 551 comprises a set of worker nodes (WNs) of a dynamically provisioned function-execution service, such as WNs 552A, 552B and 552C. Clients of such a service may provide function execution triggering conditions via programmatic interfaces to the service. When such a triggering condition is satisfied, a WN 552 may be selected dynamically to execute the corresponding function (without requiring the client to acquire any resources in advance), and the results of the function may be sent to CCIs configured in customer IVNs. The service may be said to implement a functional programming model in the depicted embodiment, according to which clients may only need to indicate the functions or logic to be executed and the conditions under which the functions are to be run, without being concerned about specific resources used to execute the functions. The CCIs may in turn send packets in response to the function results (which may for example comprise indications of additional functions to be run) back to the WN, although the CCIs may not be aware of the specific WN being used. The term "multi-VNI fan-out" is used because multiple EVNIs are used to send function results out of the PPS.

Arrows shown in bold indicate the direction in which packets comprising function results are sent in scenario 502, while dotted arrows indicate the direction in which packets comprising client responses are sent. Programs running at the WNs may be configured to request connections for sending the function results, and the flows containing the function results may therefore be referred to as "forward-direction" flows. Flow containing the client responses (if any) may be referred to as "reverse-direction" flows.

An IVNI 527 referred to as a service source VNI may be configured by a PPS 540 for the service IVN 551 in the depicted embodiment. EVNIs 524A and 524B may be set up as customer destination VNIs for customer C1's IVN 522A and customer C2's IVN 522B respectively. Customer C1's IVN 522A comprises CCIs 523A and CCI 523B. Customer C2's IVN 522B comprises CCI 523K and CCI 523L.

To simplify the presentation, IVNI 527, EVNI 524A and EVNI 524B are all mapped to a single IEC 511 by the PPS control plane in the depicted example. As such, the VIM set 541 may be propagated to the FPNs by the PPS control plane (the FPNs are not shown). VIM set 541 shows mappings between IVNI 527 and IEC 511, EVNI 524A and IEC 511, and EVNI 524B and IEC 511. IEC 511 handles exception-path tasks, such as responding to queries for PRWs and/or EPRRs, for function result and response traffic associated with both customer IVNs.

A function result packet of a particular flow originating at WN 552A may be sent via IVNI 527 (e.g., using an IP address assigned to IVNI 527 as the destination address of the packet) to the PPS. At the PPS, a packet rewriting rule or PRW (obtained at an FPN from IEC 511) may be applied, and EVNI 524A may be used to send the function result on to CCI 523A selected for example based on an indication of the destination CCI provided in the function result. The packet received at the CCI 523A may indicate an IP address of the EVNI 524A as a source address in accordance with the PRW. A response packet may be generated at the CCI 523A, and sent to the PPS using the address of EVNI 524A as a destination address. The PPS may then rewrite the response packet and send it on to the WN 552A.

Similarly, a function result packet of another flow originating at WN 552C may be sent via IVNI 527 to the PPS. At the PPS, another packet rewriting rule or PRW (obtained at an FPN from IEC 511) may be applied, and EVNI 524B may be used to send the function result on to CCI 523K. A response packet may be generated at the CCI 523K in some cases, and sent to the PPS using the address of EVNI 524B as a destination address. The PPS may then rewrite the response packet and send it on to the WN 552C.

In some cases, the number of clients utilizing a dynamically-provisioned service IVN such as IVN 551 may grow quite large. This may potentially result in overloading a given IVNI or a given IEC. In some such scenarios, additional IVNIs and/or additional IECs may be chosen to absorb some of the service workload traffic, and EPRRs of the kind introduced earlier may be employed to direct the queries from FPNs to the appropriate EPRR. Note that the scenarios illustrated in FIG. 4 and FIG. 5 are non-limiting examples of the use of multiple VNIs for the packet flows of an application or service; numerous other kinds of applications, which may not involve dynamically-provisioned services or private service endpoints may also use multiple VNIs in different embodiments. For some applications, multiple IVNIs and multiple EVNIs may be used together, for example, in an M-to-N fan—in/fan-out architecture with M IVNIs and N EVNIs.

Figure 6:
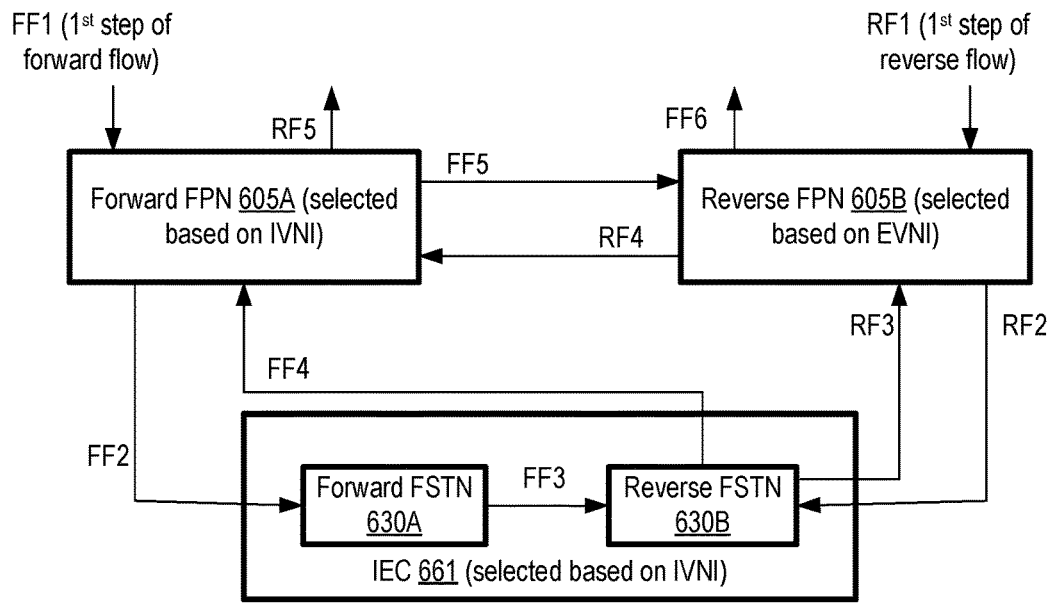
FIG. 6 illustrates examples of scenarios in which exception path flow state processing is done at an isolated exception-path cell selected using a mapping from an ingress virtual network interface, according to at least some embodiments.
Figure 6:
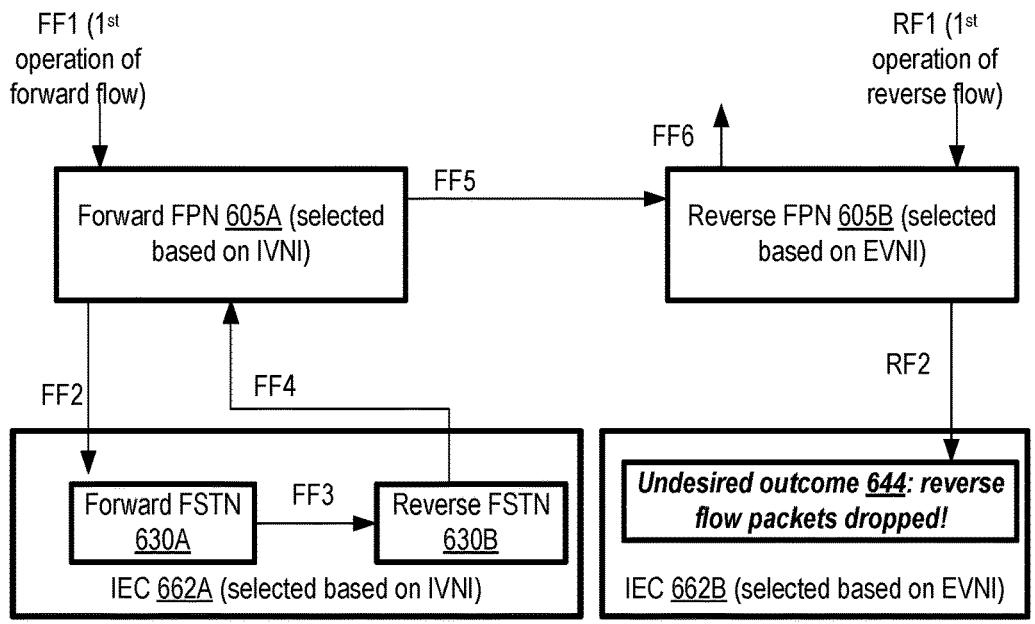

Given the isolation requirements of IECs, in various embodiments a single IEC may have to be identified for a set of flows being handled by a combination of an IVNI and a separate EVNI. FIG. 6 illustrates examples of scenarios in which exception path flow state processing is done at an isolated exception-path cell selected using a mapping from an ingress virtual network interface, according to at least some embodiments. Note that EPRRs may not be used in the embodiments depicted in FIG. 6; one purpose of FIG. 6 is to illustrate the problems that may arise when IVNI-to-IEC mappings are used to select IECs, and EVNIs are mapped to different IECs than IVNIs. Such problems can be addressed using EPRRs of the kind discussed earlier.

Under normal operating conditions, in at least some embodiments any given forward direction packet flow and the corresponding reverse-direction packet flow require only a single IVNI and a single EVNI (both VNIs are selected based on flow keys derived from the packet headers as discussed below in the context of FIG. 7). In FIG. 6 and the following figures, a single IVNI and a single EVNI corresponding to a given forward-direction packet flow (and the corresponding reverse-direction packet flow) are therefore shown. The ideas illustrated in the figures apply to all the flows of the applications, which may collectively use M IVNIs and N EVNIs where M>0 and N>0 (note that in some cases a single VNI may serve as both an IVNI and an EVNI).

In scenario 6A of FIG. 6, an IVNI-to-IEC mapping is used to select IEC 661 as the IEC to be used to manage and replicate flow state information, and both the IVNI and the EVNI are mapped via respective VIMs to IEC 661. In the first operation FF1 of a forward-direction flow, the very first packet of the flow may be received at an FPN referred to as forward FPN 605A. The forward FPN 605A may be chosen as the recipient of the forward direction packet using flow hashing in some embodiments, in which one or more headers of the packet (including a header representing the IVNI or the IVNI's IP address, which is the destination address of the packet) are hashed and the result is used to select the particular FPN from among a group of FPNs assigned to the application by the PPS control plane. As such, the forward FPN may be selected based at least in part on the IVNI.

In a subsequent operation FF2 of the forward-direction flow, a query (which includes the received packet) for a PRW may be sent to an FSTN referred to as the forward FSTN 630A, within IEC 661. IEC 661 may be selected for the query based on the destination VNI (the IVNI) indicated in the received packet. Because this is the initial packet of the flow, the forward FSTN may not have a flow state entry for the flow, and a new flow state entry may be created. A PRW for the flow may be obtained from an RDN of IEC 661, and included in the flow state entry. In at least some embodiments, PRWs for both the forward direction packets (indicating, for example, how the headers of forward direction packets are to be modified before sending the rewritten packets from the PPS on towards their destinations) and the reverse-direction packets (indicating, how the headers of reverse direction packets are to be modified before sending the rewritten packets on towards their destinations) may both be generated and stored in the flow state entry. The flow state entry may then be replicated at one or more other FSTNs of IEC 661 (e.g., to help ensure high availability of the flow state entry), including a reverse FSTN 630B, as indicated by operation FF3. The forward FSTN may be selected from among the FSTNs of IEC 661 based on the IVNI, and the reverse FSTN may be selected from among the FSTNs based on the EVNI (which may be indicated in the PRW) in various embodiments. In the depicted embodiment, the reverse FSTN may be selected such that when flow hashing is applied for a reverse-direction packet, the reverse FSTN would be chosen as the target FSTN for the reverse-direction packet. In operation FF4 of the forward flow, the PRW for the forward direction flow may be sent to the forward FPN 605A from the reverse FSTN. The received PRW, may be stored in a local cache of the forward FPN 605A in various embodiments. In accordance with the received PRW, in operation FF5, the packet may be sent to a reverse FPN 605B (selected for example using a function applied to the EVNI, which is indicated in the forward direction PRW). In operation FF6, a rewritten version of the packet, modified in accordance with the forward-direction PRW, may be sent to a destination indicated in the forward-direction PRW. In the rewritten version, the address of the EVNI may be indicated as the source address in at least some embodiments.

A variety of metadata pertaining to the flow, in addition to the PRW(s), may be included in the flow state entry that is replicated at the FSTNs in different embodiments. An indication of the category of packet transformation being implemented for the flow (e.g., multicast, anycast, etc.) may be included in one embodiment, e.g., as part of the PRW. In some embodiments, the PRW details may comprise the values to be written into one or more headers of the packets, such as the destination IP address and port. Respective indications as to whether either the source or destination has requested a "close" of a connection established between them may be included in a flow state entry in the depicted embodiment. A last activity timestamp may be included in the entry in some embodiments, which may for example be useful in cache replacement operations if an LRU algorithm is being used at various PPS nodes, and may also be useful in detecting whether a particular flow may have reached an error state (e.g., if no activity has been observed for a long time).

A number of fields associated with sequence numbers which may be used in some networking protocols may be included in the flow state entry in some embodiments. These fields may include, for example, the initial and current sequence numbers respectively for inbound packets (e.g., packets received at the PPS from the sources or traffic origins associated with the flow), as well as the initial and current sequence numbers for outbound packets (e.g., packets received at the PPS from traffic responders).

In some embodiments, the flow state information entries may also include metadata elements which can be used to detect and/or respond to one or more kinds of denial of service attacks. The IP TTL (time-to-live) value is a measure of how many hops a packet has traversed to reach the PPS. For the vast majority of legitimate flows, the IP TTL is very unlikely to change among the different packets of a given flow. For a small fraction of legitimate flows, there may be a few distinct TTL values. Thus, by tracking up to some small number N (e.g., four) unique IP TTL values per flow and rejecting packets with other TTLs, it may be easy to filter out packets associated with at least some types of denial of service attacks. Accordingly, a TTL list with some configurable number of distinct TTL values seen for the flow may be maintained in the flow state entry in some embodiments. A denial of service attack may sometimes involve so-called "ACK Floods", in which large numbers of TCP packets with their "ACK" bits set may be sent to the FMS. ACK floods may be handled at least in part by dropping packets that do not have a matching rewrite entry in some embodiments. It may be possible to make this defense more effective by also tracking the TCP window size in either direction (e.g., using elements of the flow state entry in the depicted embodiment), and rejecting packets that are too far from the valid TCP transmission window. Denial of service attacks may also comprise illegitimate TCP SYN packets in some cases. Mitigating this type of attack may include responding to SYN packets with "SYN cookies". SYN cookies are SYNJACK response packets that have a cryptographically generated sequence number. Denial of service attackers may typically ignore this response, but a legitimate sender (i.e., an entity that is not participating in a denial of service attack) may typically reply to it. If and when a reply to such a SYN/ACK response packet is received, the sender may be deemed to be legitimate. In at least some embodiments, a SYN cookie offset may be included in a flow state entry to enable the FPN to modify the sequence and/or acknowledgement numbers of transformed packets in accordance with the use of a SYN cookie.

In the embodiment depicted in FIG. 6, a client identifier (e.g., an account identifier or customer identifier associated with the sources and/or destinations of the flow) may also be maintained in at least some flow state information entries. In some implementations in which at least some of the packets received at the PPS include such client identifiers, the PPS nodes may verify that the client identifiers in the received packets match those stored in the flow state entry, and may reject packets which do not indicate the expected client identifier. It is noted that in various embodiments, one or more of the elements of flow state discussed above may not be stored in the flow state entries—e.g., if defending against denial of service attacks is not a priority for some PPS customers because all their traffic originates at a small set of sources, the TTL list, window size, or SYN cookie offset may not be required. In some cases, a flow state information entry may include one or more elements not listed above. The particular kinds of metadata to be included in the flow state information entries associated with a given packet processing requirement may be determined in some embodiments by the rewrite decision nodes based on control plane interactions with PPS clients.

In response to the rewritten version of the packet, the recipient may send a reverse-direction packet as indicated in operation RF1 of the reverse-direction packet flow of scenario 6A to reverse FPN 605B (selected based on the address of the EVNI). Because this is the first reverse-direction packet, a PRW for it may not be available at the reverse FPN 605B, and a query may be sent to reverse FSTN 630B as indicated by RF2. The IEC 661 may be chosen as the target IEC for the query based on the VIM mapping the EVNI (whose address is used as the destination address of the reverse-direction packet) to IEC 661. The reverse FSTN 630B may already have a reverse-direction PRW for the reverse-direction flow (in the state replication entry generated and replicated earlier), and the reverse FSTN may send this PRW to the reverse FPN 605B in operation RF3. In accordance with the PRW, the reverse FPN 605B may forward the reverse-direction packet to forward FPN 605A (operation RF4), from where a rewritten version of the packet (modified in accordance with the reverse-direction PRW) may be sent to the source of the forward-direction packet (operation RF5). Note that the set of operations shown for scenario 6A may not be comprehensive—that is, other operations that may be performed in some implementations in addition to those shown.

Note further that in accordance with the flow state replication policy used in scenario 6A, when the first reverse-direction packet is received, it is sent to an FSTN (FSTN 630B in the example) at an IEC to which the EVNI is mapped (the address of the EVNI is the destination address of the reverse-direction packet in step RF1). From the perspective of the reverse direction FPN 605B, the fact that the packet is flowing in the "reverse" direction may not be apparent, and so the received packet may be treated the same as any packet received at that FPN—that is, the destination VNI of the received packet may be used to select the IEC to which a query for a PRW is to be sent. This algorithm for selecting the target IEC based on the destination VNI of a received packet may lead to problems if the EVNI is mapped to a different IEC than the IVNI, as shown in scenario 6B.

In scenario 6B, the IVNI of the flow is mapped to IEC 662A, while the EVNI is mapped to IEC 662B. The operations FF1, FF2, FF3, FF4, FF5 and FF6 of the forward-direction flow in scenario 6B are identical to the corresponding steps of the forward-direction flow of scenario 6A. A flow state entry comprising the PRWs for the forward and backward direction flows may be created and replicated at forward FSTN 630A and reverse FSTN 630B within IEC 662A (selected based on the IVNI). Because of the isolation requirements of IECs, the flow state information may not be sent to the IEC 662B to which the EVNI is mapped. This means that, when the first packet of the reverse flow is received at reverse FPN 605B, and a query is sent to IEC 662B (recall that the target IEC is selected based on the destination VNI on the received packet), a flow state entry for the flow may not be available. An undesired outcome 644 may occur because of the lack of the expected flow state entry, and the packets of the reverse direction flow may be dropped in accordance with the policies of the PPS for handling apparently misdirected packets in at least some embodiments. To avoid such undesired outcomes, EPRRs that direct FPNs to send queries for PRWs to (and cause flow state entries to be created and replicated at) the IEC to which the EVNI of the flow is mapped (rather than the IEC to which the IVNI is mapped) may be employed in various embodiments.

Figure 7:
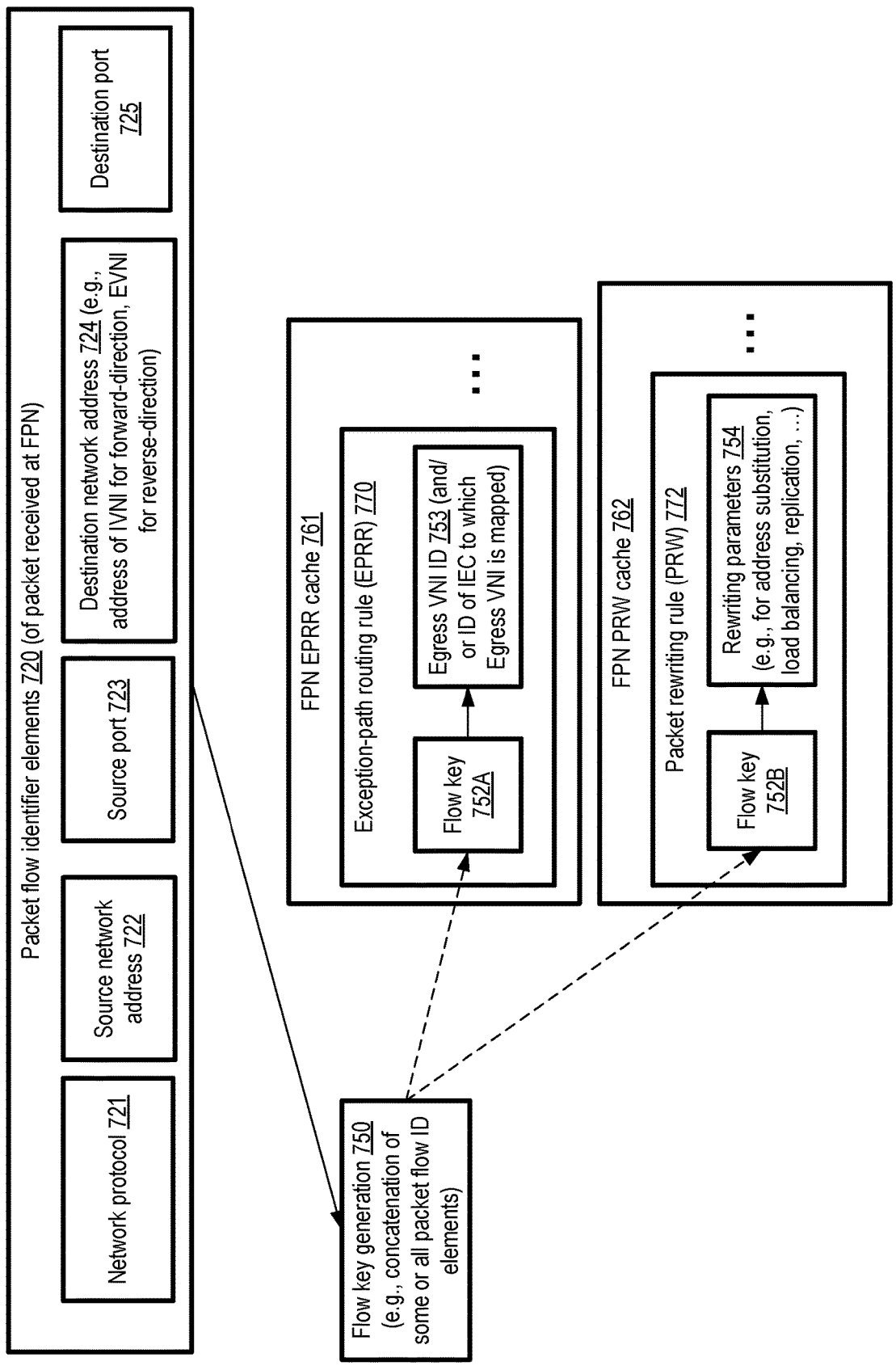
FIG. 7 illustrates examples of exception-path routing rules and packet rewriting rules that may be utilized at a packet processing service, according to at least some embodiments.

FIG. 7 illustrates examples of exception-path routing rules and packet rewriting rules that may be utilized at a packet processing service, according to at least some embodiments. When a packet is received at an FPN, a number of flow identifier elements 720 of the packet may be extracted from the headers of that packet in the depicted embodiment, and used to construct a flow key for the packet in a flow key generation operation 750. The packet flow ID elements may for example include the network protocol 721 used for sending the packet to the FPN, the source network address 722, the source port 723, the destination network address 724 (e.g., an address assigned to an IVNI for forward-direction packets, and an address assigned to an EVNI for reverse-direction packets), and/or the destination port 725. A number of different networking protocols may be supported in different embodiments—e.g., including IP version 4 or version 6, the Transmission Control Protocol (TCP), the User Datagram Protocol (UDP), the Internet Control Message Protocol (ICMP) and the like. Flow key generation 750 may comprise concatenation of, or other functions applied to, a subset or all of the flow identifier elements 720 in some embodiments.

In various embodiments, EPRRs 770 may be organized as key-value pairs, with a flow key 752A being mapped to an egress VNI ID 753 in each EPRR. The EPRRs may be stored at least temporarily in an FPN's EPRR cache 761 in some embodiments. A given EPRR may be used, along with the VIM for the egress VNI ID, to identify the particular IEC to which queries for PRWs should be sent from an FPN for a given flow in some embodiments. In other embodiments, instead of or in addition to storing the egress VNI's identifier in the EPRR, an identifier of the IEC to which the egress VNI is mapped may be stored in the EPRR. In at least some embodiments, in addition to the indication of the egress VNI or the IEC to which the egress VNI is mapped, an EPRR entry in cache 761 may include a time-to-live or TTL setting. Such a TTL setting may be refreshed (e.g., by re-setting it to N seconds from the current time) each time the EPRR entry is accessed in at least some implementations, e.g., to ensure that EPRR entries that are frequently used are less likely to be evicted from the cache. When searching for eviction candidates in the EPRR cache, the FPN may preferentially select entries with expired TTLs (or with TTLs that are about to expire) as candidates instead of entries that have longer unexpired TTLs.

In the FPN's PRW cache 762, a PRW 772 for the flow may be stored as another key-value pair, with a flow key 752B being mapped to a set of packet rewriting parameters 754. The rewriting parameters 754 may indicate how address substitution, load balancing, outbound packet replication or other types of packet processing operations are to be performed. For example, in a scenario in which the PPS is being used for load balancing, the parameters may indicate a set of back-end service targets among which request packets are to be distributed, the weights (if any) assigned to individual ones of the targets, and so on. In some implementations, EPRRs and PRWs for a given flow may be combined and stored in a single data structure instead of using separate data structures, and/or a single cache may be maintained for both kinds of information. TTLs may also be associated with cached PRWs in at least some embodiments.

Figure 8:
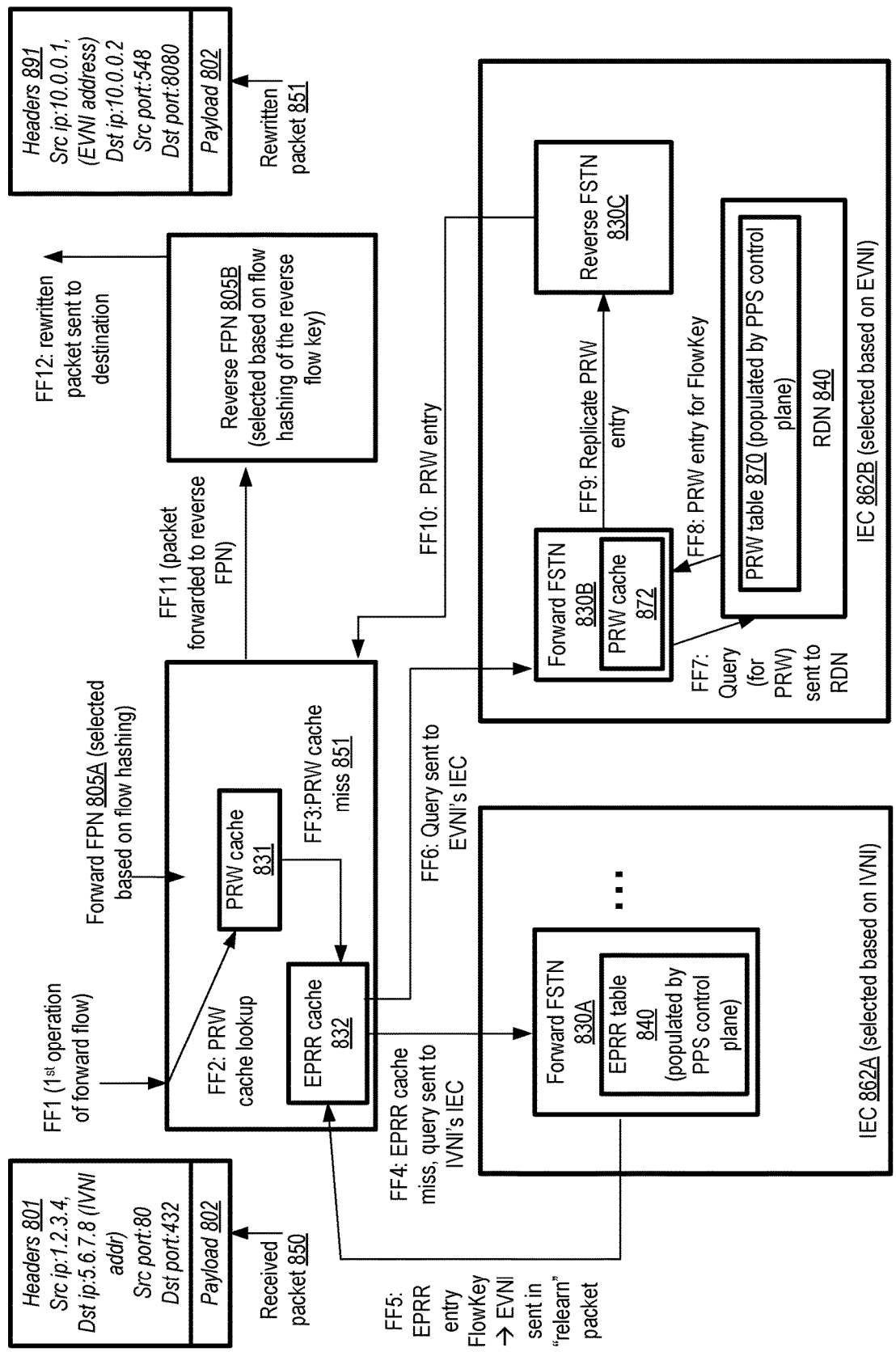
FIG. 8 illustrates example interactions among packet processing service components during a forward-direction flow of an initial packet of a packet flow for which a packet rewriting rule has not yet been obtained at a fast-path node, according to at least some embodiments.

FIG. 8 illustrates example interactions among packet processing service components during a forward-direction flow of an initial packet of a packet flow for which a packet rewriting rule has not yet been obtained at a fast-path node, according to at least some embodiments. In the example scenario shown, a forward FPN 805A (selected based at least in part on the IVNI of the flow) receives forward-direction packets of the flow from source endpoints, and a reverse FPN 805B (selected based at least in part on the EVNI) sends forward-direction packets from the PPS to their intended destination endpoints. Headers 801 of an example received packet 850 may indicate a source IP version 4 address (src ip) 1.2.3.4, a destination IP version 4 address (dst-ip) 5.6.7.8, a source port (src port) 80, and a destination port (dst port) 432; the received packet may also comprise a data payload 802. The destination IP address 5.6.7.8 may be an IP address assigned by the PPS or the VCS to an IVNI for the application whose flows are being processed. The VIMs available at the FPN 805A may indicate a mapping from the IVNI to IEC 862. Within the IEC 862A, a forward FSTN 830A may store an EPRR table 841, populated with EPRR entries of the kind shown in FIG. 7. The EPRR entries of EPRR table may have been sent to the FSTN from the PPS control plane in the depicted embodiment.

In operation FF1, the first operation of the forward flow, packet 850 may be received at FPN 805A (selected for the packet based on flow hashing, and therefore based at least in part on the IVNI). In operation FF2, a lookup for a PRW for the packet may be performed in a PRW cache 831 of FPN 805A. A PRW cache miss may result (FF3), because this is the initial packet of the flow, and a lookup may be conducted for an EPRR in EPRR cache 832. The EPRR cache lookup may also result in a miss, and query may be sent (FF4) from FPN 805A to IEC 862A in the depicted embodiment. IEC 862A may be selected as the target for this query based on the IVNI of the flow, and FSTN 830A may be selected as the specific FSTN within the IEC based on flow hashing in some embodiments.

At FSTN 830A, a flow key-based lookup may be conducted in the EPRR table 841, and an EPRR for the flow key may be found. Next, the FSTN 830A may determine whether the EVNI indicated in the EPRR is mapped to the FSTN's IEC 862A. In the example shown in FIG. 8, the EVNI is mapped to IEC 862B, and not to IEC 862A. This may indicate to the FSTN 830A that flow state information for the flow is not to be generated and stored in IEC 862A. Consequently, in operation FF5, the EPRR (which indicates a mapping between the flow key and the EVNI of the flow) may be sent in a packet (referred to as a "relearn" packet in some embodiments) to the FPN 805A. At the FPN 805A, the EPRR entry may be stored in the EPRR cache 832.

The FPN 805A may use its VIM set (provided by the PPS control plane) to identify the IEC (IEC 862B) to which the EVNI is mapped, and send a second query to this IEC 862B in the depicted embodiment. In embodiments in which the EPRR entry itself indicates the IEC 862B (as opposed to just the EVNI's identifier), a mapping lookup in the VIM set may not be required. The forward FSTN (FSTN 830B) within IEC 862B to which the second query is sent may be chosen based on flow hashing of the forward-direction flow key in at least some embodiments.

FSTN 830B may perform its own lookup for an EPRR in its EPRR table using the flow key of the received query's packet in some embodiments. Such an entry may be found, indicating that the flow state information for the flow is to be stored in the IEC to which the EVNI is mapped. The FSTN 830B may then determine whether the EVNI is mapped to IEC 862B. Upon detecting that the EVNI is indeed mapped to IEC 862B, the FSTN 830B may determine that flow state information for the flow is to be generated and replicated at the FSTN 830B's own IEC 862B. A lookup for a PRW for the flow may be conducted in FSTN 830B's PRW cache 872, and a cache miss may result.

In operation FF7, the FSTN 830B may send a query for the PRW to an RDN 840 within IEC 862B. The RDN 840 may have access to a PRW table 870 (populated by the PPS control plane) within which a PRW for the flow key may be found. In operation FF8, the PRW entry for the flow key may be sent to the forward FSTN 830B from the RDN. At the forward FSTN, the PRW may be stored in the PRW cache 872. A flow state entry may be created for the flow key, and the flow state entry (which may include the PRW) may be sent to a reverse FSTN 830C within IEC 862B for replication in the depicted embodiment in operation FF9. In at least some embodiments, once the forward direction PRW has been determined, the corresponding reverse-direction PRW may also be generated (e.g., because the packet headers identifying the IVNI, the EVNI, the source from which the forward-direction packet was received at the PPS, and the destination to which the forward-direction packet is to be sent from the PPS are all known at this stage) and included in the flow state entry. The reverse FSTN 830C may store the PRW(s) in its own cache, and send the forward-direction PRW to the forward FPN 805A in the depicted embodiment.

The received forward-direction PRW may be stored in PRW cache 831, and re-used for subsequent forward-direction packets of the same flow (if any such packets arrive) by the FPN 805A. In accordance with the forward-direction PRW, the packet may be forwarded (along with the forward-direction PRW itself) to a reverse FPN 805B selected based on the EVNI (e.g., using flow hashing on the reverse-direction flow key) in operation FF11. In operation FF12, a rewritten version of the packet 851 may be sent to its destination. In the example shown, the rewritten version of the packet may comprise the same payload 802 as the received packet 850. However, the headers 891 may now indicate 10.0.0.1 (an address assigned to the EVNI) as the source address, 10.0.0.2 as the destination address (selected based on the forward-direction PRW), a source port 548, and a destination port 8080 (with both ports also being chosen based on the PRW). Using IEC 862B (to which the EVNI rather than the IVNI is mapped) to store flow state information for the flow may enable the reverse-direction packets to be handled without undesired outcomes of the kind shown in scenario 6B of FIG. 6, as shown in FIG. 9 and discussed below.

In the embodiment depicted in FIG. 8, the FSTN 830A is a source for exception-path routing information (comprising the EPRR) for FPN 805A. In other embodiments, a control plane server may provide EPRRs to FPNs directly, without using FSTNs as intermediaries. Thus, in different embodiments, FSTNs (at an IEC to which the IVNI is mapped) or control plane servers may act as exception-path routing information sources for FPNs. In some embodiments in which the control plane servers act as EPRR sources, the EPRRs may be pushed to the FPNs by the control plane, without requiring queries to be sent from the FPNs to the control plane; in other embodiments, the FPNs may obtain the EPRRs directly from the control plane by sending queries to the control plane when needed. In at least one embodiment, the PPS may comprise another set of nodes, referred to as EPRR distribution nodes, that obtain the EPRRs from the control plane servers and provide the EPRRs to the FPNs (but are not responsible for maintaining flow state like the FSTNs). In some implementations, the FPNs may send queries to such EPRR distribution nodes and receive the EPRRs in responses to the queries. In other implementations, the EPRRs may be propagated proactively by the EPRR distribution nodes to the FPNs, without requiring queries for the EPRRs to be sent by the FPNs.

Figure 9:
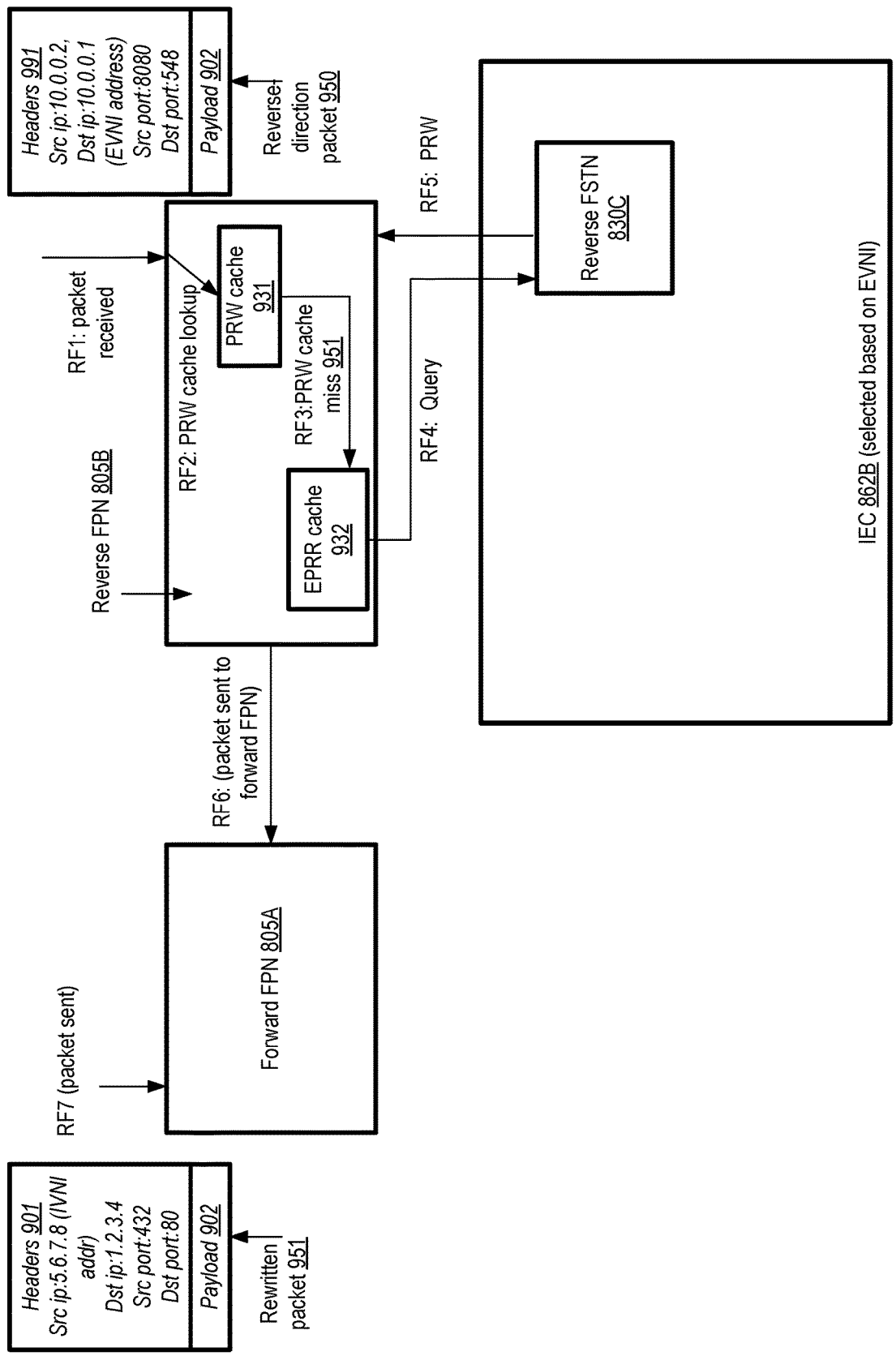
FIG. 9 illustrates example interactions among packet processing service components during a reverse-direction flow of a packet, according to at least some embodiments.

FIG. 9 illustrates example interactions among packet processing service components during a reverse-direction flow of a packet, according to at least some embodiments. After a rewritten packet of the forward-direction flow is received at a destination from the PPS (e.g., after operation an operation similar to operation FF12 shown in FIG. 8), a response packet in the reverse direction in at least some cases. For example, if the forward-direction packet comprises a service request targeted at a particular service, and the destination comprises a back-end server that can implement the service request, the reverse-direction packet may comprise a value or result obtained from implementing the service request.

The initial reverse-direction packet 950 of a given flow may be received at the reverse FPN 805 in operation RF1 in the example scenario shown in FIG. 9. The headers 991 of the packet may indicate 10.0.0.2 as the source IP address, 10.0.0.1 (an address assigned to the EVNI for the flow) as the destination IP address, source port 8080 and destination port 548. (The source and destination addresses and ports of the packet 950 are reversed, compared to the rewritten packet 851 shown in FIG. 8.) The payload 902 may comprise the data being sent from the destination back to the source of the forward-direction packet. The reverse FPN 805B may be selected as the destination for packet 950 based on flow hashing in the depicted embodiment—as such, the EVNI address may comprise one of the factors used for selecting the FPN.

Upon receiving the packet 950, the FPN 805B may perform a PRW cache lookup in its local PRW cache 931 using the flow ID of the packet in the depicted embodiment (operation RF2). As packet 950 is the first reverse-direction packet, a PRW cache miss may occur (operation RF3), and a lookup for an EPRR in EPRR cache 932 may be performed next. A cache miss may occur in the EPRR cache 932, so in operation RF4, a query may be sent to the reverse FSTN 830C in IEC 862B. IEC 862B may be selected as the destination IEC for the query based on a VIM which maps the destination VNI of the packet, EVNI, to IEC 862B, and the reverse FSTN 830C may be selected based on flow hashing. The reverse FSTN 830C may not find any EPRR for the reverse-direction flow in its EPRR table, but may find a flow state entry comprising a PRW for the reverse-direction flow (which was replicated at the FSTN 830C in operation FF9 of FIG. 8). The PRW may be sent to the FPN 805B in operation RF5.

At the FPN 805B, the PRW for the reverse-direction flow may be stored in PRW cache 931, and the packet 950 may be sent to forward FPN 805A in accordance with the PRW (operation RF6). A rewritten version 951 of the packet may then be sent (in operation RF7) to the source from which the corresponding forward-direction packet was received earlier. The headers 901 of the rewritten packet in FIG. 9 indicate a source IP address 5.6.7.8 (an IP address assigned to the IVNI), a destination IP address 1.2.3.4 (which was the source IP address of the forward-direction packet 850 of FIG. 8), a source port 432 and a destination port 80. The payload 902 may be included in the rewritten packet without modification in various embodiments. Because the IEC 862B (to which the EVNI of the flow was mapped) was selected to store flow state information for the flow, instead of the IEC 862A (of FIG. 8) to which the IVNI is mapped, the undesired outcome illustrated in scenario 6B of FIG. 6 was avoided in the embodiment depicted in FIG. 9.

Figure 10:
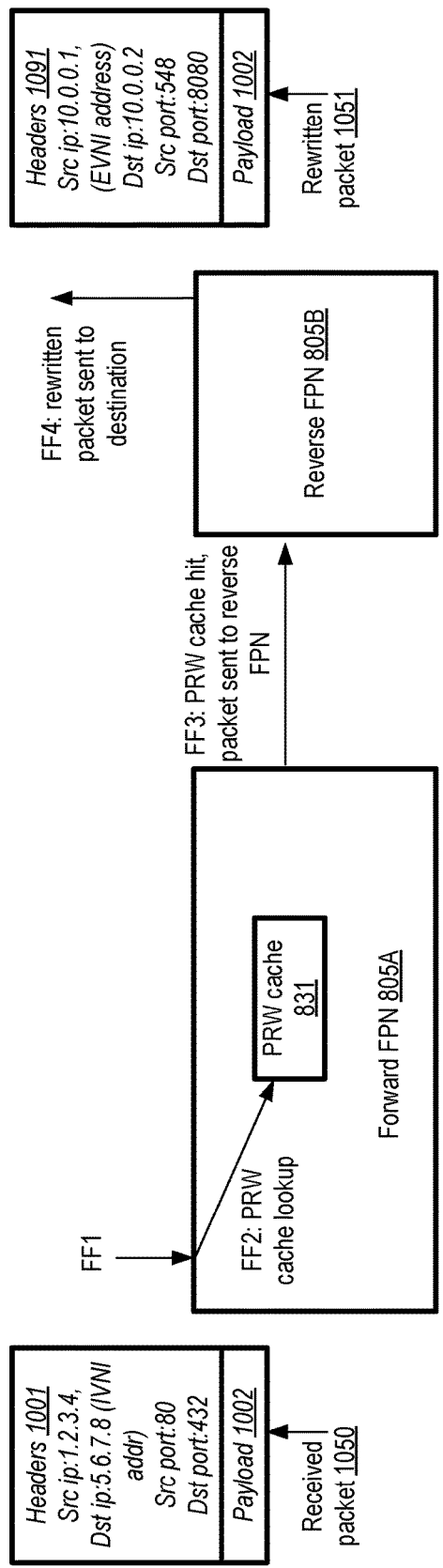
FIG. 10 illustrates example interactions among packet processing service components during a forward-direction flow of a packet of a packet flow for which a rewriting rule is present in a cache at a fast-path node, according to at least some embodiments.

FIG. 10 illustrates example interactions among packet processing service components during a forward-direction flow of a packet of a packet flow for which a rewriting rule is present in a cache at a fast-path node, according to at least some embodiments. Forward FPN 805A receives a packet 1050 in operation FF1 of a forward-direction flow. The destination IP address of the packet (5.6.7.8) in headers 1001 is an address assigned to the IVNI. In operation FF2, a lookup based on the flow ID of the received packet is performed in PRW cache 831 of the FPN, and an entry comprising a PRW for the forward direction is found in the cache.

In accordance with the PRW found in the cache, the packet may be sent to the reverse FPN 805B in operation FF3. From the reverse FPN, a rewritten version of the packet 1051 with headers 1091 (modified in accordance with the PRW, which may be cached at the reverse FPN as well or may be transmitted in operation FF3 to the reverse FPN) may be sent to the intended destination in operation FF4. The payload 1002 included in the rewritten packet may, for example, comprise an additional service request from a client of a service which is implemented at the destination. No interactions with EPNs may be needed for the cases in which the PRW for a flow is already present in an FPN's PRW cache in various embodiments. While FIG. 10 shows only the operations for forward direction packets, similar operations may be performed for reverse direction packets, also without requiring interactions with EPNs. Note that in practice, for applications in which multiple packets are sent over the same connection, the vast majority of packets may be processed very efficiently by the FPNs using cached PRWs.

Figure 11:
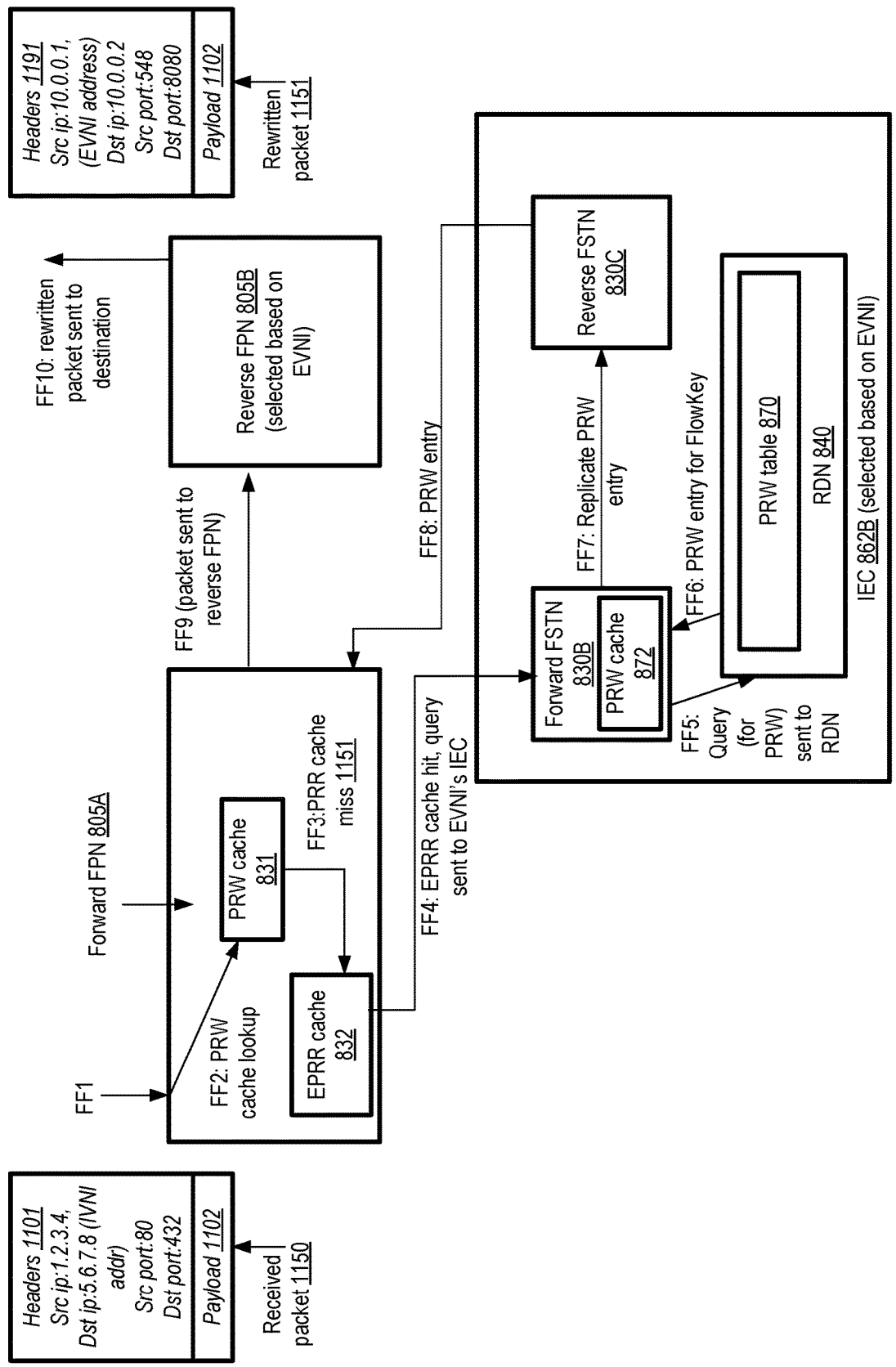
FIG. 11 illustrates example interactions among packet processing service components during a forward-direction flow of a packet of a packet flow for which a rewriting rule is not present in a cache at a fast-path node, while the fast-path node has a cached exception-path routing rule for the packet flow, according to at least some embodiments.

FIG. 11 illustrates example interactions among packet processing service components during a forward-direction flow of a packet of a packet flow for which a rewriting rule is not present in a cache at a fast-path node, while the fast-path node has a cached exception-path routing rule for the packet flow, according to at least some embodiments. This type of scenario may arise, for example, if the following sequence of events occurs: first, a connection Conn1 is established between a traffic source and a traffic destination using the PPS, and utilized for sending some number of forward direction packets using a PRW which is cached at the forward FPN for the flow. An EPRR indicating that the IEC to which the EVNI of the flow is mapped is to be used for the flow is obtained at the forward FPN and stored in its EPRR cache. Then, Conn1 is closed, and the PRW entry in the PRW cache for the flow is replaced or removed, but the EPRR entry remains in the EPRR cache for some time (e.g., before it is replaced or deleted from the EPRR cache). Finally, another connection is established by the same traffic source to the traffic destination during the time interval in which the EPRR entry remains cached. This second connection is utilized for a second forward-direction packet flow.

In the example shown in FIG. 11, an initial packet 1150 of a forward direction flow, containing a payload 1102, may be received in operation FF1 at a forward FPN 805A, with the IVNI IP address 5.6.7.8 as the destination address in its headers 1101. In operation FF2, a PRW cache lookup may be performed. PRW cache 831 may not contain a PRW for the forward direction, so a lookup may be performed in the EPRR cache using the flow key (operation FF3). In this example, an EPRR may be found, indicating that a query for the PRW should be sent to the IEC 862B to which the EVNI of the flow is mapped. The remaining operations performed for the forward direction may match those shown in FIG. 8: e.g., operation FF4 of FIG. 11 corresponds to operation FF6 of FIG. 8, operation FF5 of FIG. 11 corresponds to operation FF7 of FIG. 8, operation FF6 of FIG. 11 corresponds to operation FF8 of FIG. 8, operation FF7 of FIG. 11 corresponds to operation FF9 of FIG. 8, operation FF8 of FIG. 11 corresponds to operation FF10 of FIG. 8, operation FF9 of FIG. 11 corresponds to operation FF11 of FIG. 8, and operation FF10 of FIG. 11 (in which rewritten packet 1151 with headers 1191 is transmitted) corresponds to operation FF12 of FIG. 8. The main difference in the operations between the scenarios of FIG. 8 and FIG. 11 is that because of the cache hit in the forward FPN's EPRR cache, operations similar to FIG. 8's FF4 and FF5 may not be required in the scenario depicted in FIG. 11. The reverse direction flow corresponding to FIG. 11 may comprise similar operations to those shown in FIG. 9.

Figure 12:
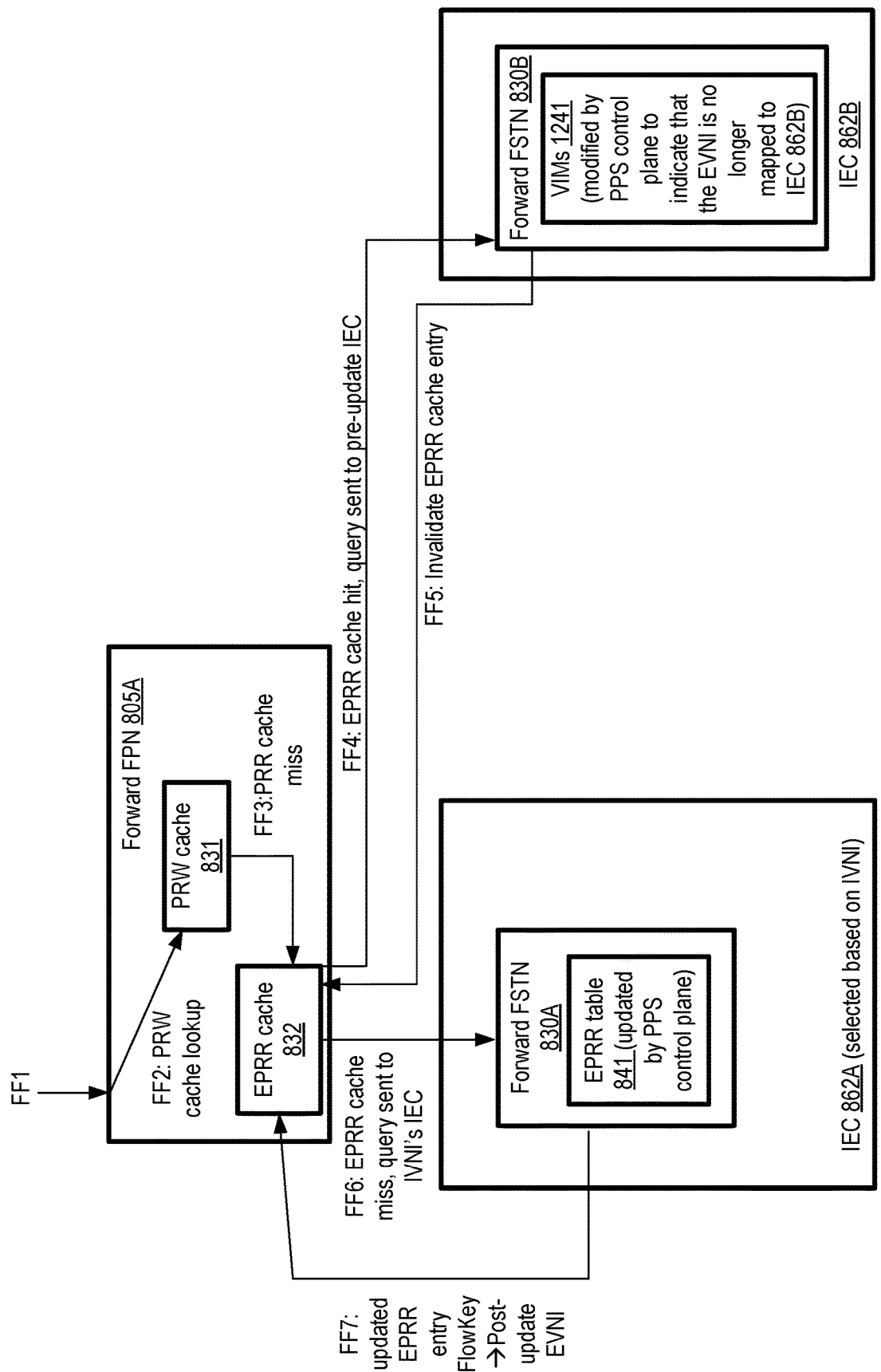
FIG. 12 illustrates example interactions associated with invalidation of exception-path routing rules among packet processing service components, according to at least some embodiments.

In some cases, as mentioned earlier, the PPS control plane may wish to balance workloads across IECs, and so may change/modify one or more of the VNIs used for a given application (e.g., assigning a different EVNI than the one which was being used earlier for an application), or map an existing VNI to a different IEC. Such modifications may require invalidations of EPRR entries. FIG. 12 illustrates example interactions associated with invalidation of exception-path routing rules among packet processing service components, according to at least some embodiments. In the scenario depicted in FIG. 12, the PPS control plane has remapped the EVNI which was being used for a given application (and which was initially mapped to IEC 862B) to a different IEC at a point of time at which the EPRR which was created for the EVNI remains cached at an FPN. As a result of the remapping, VIMs 1241 at forward FSTN 830B have been updated, so that the EVNI is no longer being shown as mapped to IEC 862B. Also, the EPRR entry corresponding to the forward direction flow may have been removed from the EPRR table of FSTN 830B by the PPS control plane.

In operation FF1 of FIG. 12, an initial packet of new flow is received at a forward FPN 805A. In operation FF2, a PRW cache lookup is conducted in PRW cache 831. A cache miss occurs, and a lookup in the EPRR cache 832 is then conducted (operation FF3). An EPRR entry is found, which results in a query being directed (operation FF4) from FPN 805A to a forward FSTN 830B in the pre-update IEC 862B (i.e., the IEC to which the EVNI was mapped prior to the remapping by the PPS control plane).

At the forward FSTN 830B, it may be determined that (a) there is no longer a relevant EPRR entry present in the EPRR table of the FSTN and that (b) neither the IVNI nor the EVNI of the flow is mapped to IEC 862B. Accordingly, in operation FF5, a message to invalidate the EPRR entry in EPRR cache for the flow may be sent to FPN 805A. FPN 805A may then remove the entry from the EPRR cache, and send a query to the IVNI's IEC (operation FF6), in effect requesting an EPRR. The updated EPRR entry may be found in EPRR table 841 and sent in operation FF7 to the FPN 805A. The updated entry may then be used by the FPN to send a query for a PWR to the correct (updated) IEC, and operations similar to those shown in FIG. 8 (operations FF6 onwards of FIG. 8) may be performed for the forward-direction packet in the depicted embodiment. In various embodiments, PPS control-plane initiated re-mappings of the kind discussed in the context of FIG. 12 may be relatively infrequent, so corresponding EPRR cache entry invalidations may also only be needed infrequently.

Figure 13:
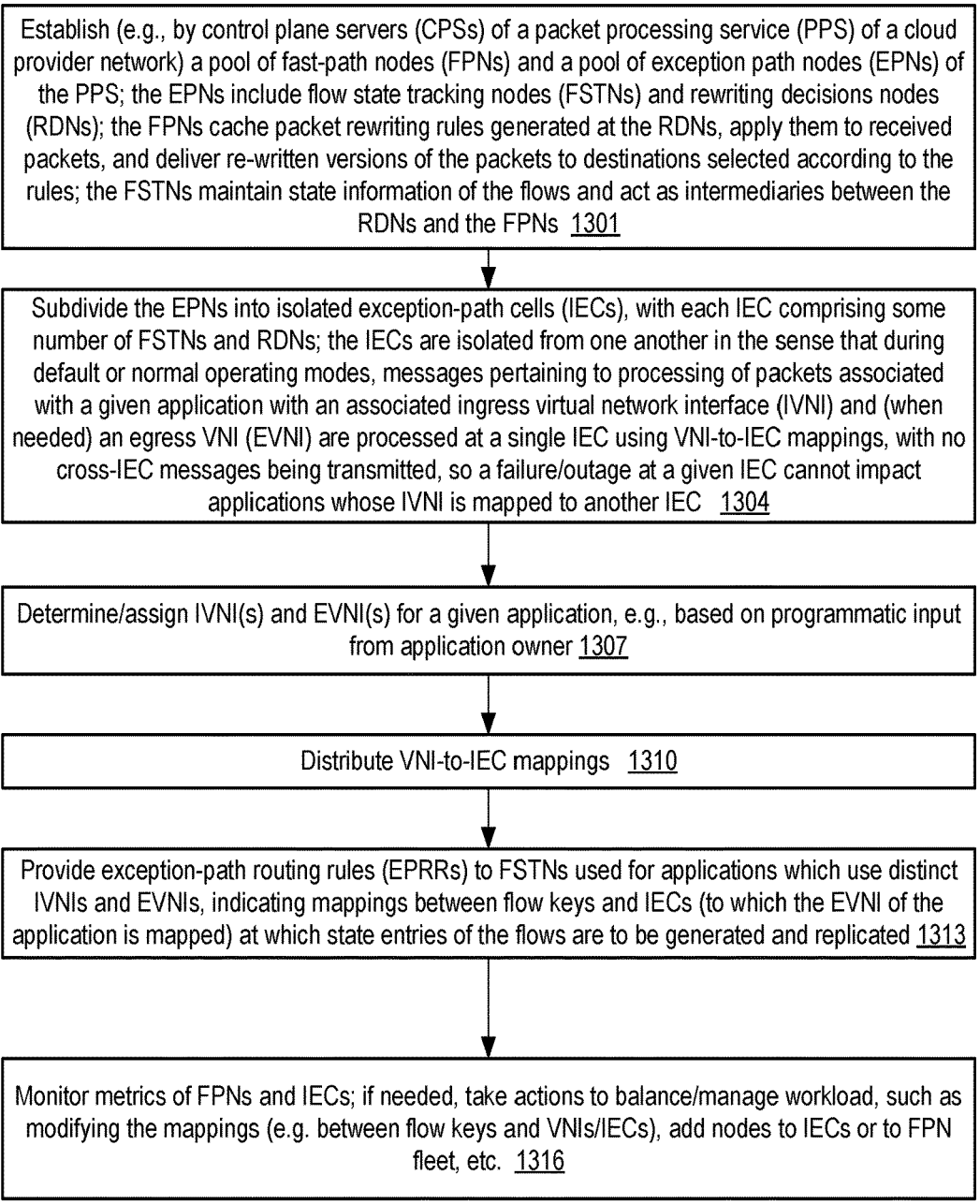
FIG. 13 is a flow diagram illustrating aspects of operations which may be performed by control plane servers of a packet processing service, according to at least some embodiments.

FIG. 13 is a flow diagram illustrating aspects of operations which may be performed by control plane servers of a packet processing service, according to at least some embodiments. As shown in element 1301, a pool of FPNs and a pool of EPNs may be established at a PPS of a cloud provider network, similar in features and functionality to PPS 102 of FIG. 1. For example, the pools, which may be considered data plane resources of the PPS, may be set up by control plane servers (CPSs) of the PPS. The EPNs may include FSTNs and RDNs. The FPNs may cache packet rewriting rules (PRWs) generated/provided by the RDNs and transmitted to the FPNs by the FSTNs, apply the rules to received packets, and deliver the rewritten versions of the packets to destinations (e.g., back-end servers implementing applications for which requests generated by application clients are in the received packets, or clients to whom responses to application requests are to be sent) selected according to the rules. The FSTNs may maintain state information of the flows (including for example the rewriting rules themselves, activity timestamps, sequence numbers, window sizes, client identifiers, etc.) and act as intermediaries between the RDNs and the FPNs. At least some of the applications whose packets are processed using the PPS may be implemented using resources (e.g., compute instances or virtual machines of a VCS) of the provider network in some embodiments. Each of the FPNs, FSTNs and/or RDNs may maintain caches one or more types, including caches for PRWs, so that cached flow state information can be used to quickly respond to requests directed at the nodes from other layers of the PPS, or (in the case of the FPNs) to rewrite packets quickly for transmission to their intended destinations. The rewriting rules provided by the RDNs may be used to implement a variety of packet processing tasks in different embodiments, including for example anycast operations, multicast operations, source address substitution, load balancing, implementing a cross-isolated-virtual-network channel, or providing connectivity via a virtual private network (VPN) connection. In some embodiments, at least some versions of rewriting rules may be generated by a CPS based on customer input and provided to an RDN, from where the rules (e.g., executable versions of the rules) may in turn be provided to FSTNs (and to FPNs via the FSTNs).

The pool of EPNs may be subdivided or partitioned into a collection of IECs in some embodiments, with each IEC comprising some number of FSTNs and some number of RDNs (element 1304). In some embodiments, each IEC may comprise the same number of FSTNs as each of the other IECs, and/or the same number of RDNs as each of the other IECs. In other embodiments, some IECs may comprise more FSTNs than other IECs, and/or more RDNs than other IECs, so IEC populations may differ. The nodes of different IECs may be logically isolated from each other in the sense that during default or normal modes of operation, messages pertaining to processing of packets associated with a given application to which a given ingress virtual network interface (IVNI) and/or a given egress VNI (EVNI) has been assigned are processed at a single IEC using VNI-to-IEC mappings provided to FPNs by the control plane servers, with no cross-IEC messages being transmitted. Such isolation may be beneficial, for example, in that a failure/outage at a given IEC may impact at most those applications whose VNIs are mapped to that IEC, and may not impact applications whose VNIs are mapped to other IECs.

A CPS may determine or assign one or more IVNIs and one or more EVNIs for a given application whose traffic is to be processed at the PPS in the depicted embodiment (element 1307). In some embodiments, an application may require only a single VNI which serves as both an ingress and an egress VNI, in which case only one VNI may be assigned. In various embodiments, PPS customers/clients may provide descriptors of their application requirements via programmatic interfaces (e.g., web-based consoles, command-line tools, graphical user interfaces or application programming interfaces) of the PPS, and VNIs may be assigned to their applications based on the descriptors by the CPSs. The CPSs may also assign individual VNIs to IECs—that is, for traffic associated with a given VNI, a particular IEC may be selected by the control plane. The mappings between VNIs and IECs may be distributed by the PPS control plane to various PPS nodes (element 1310) including a group of FPNs, FSTNs and/or RDNs selected for the application (the FSTNs and RDNs may be members of the IECs to which the VNIs of the application are mapped). A given VNI-to-IEC mapping may indicate the "home" IEC for the VNI, i.e., the IEC at which at least some configuration information associated with the VNI (such as EPRR tables for flows whose destination IP address is assigned to the VNI) is stored in the depicted embodiment.

According to at least one embodiment, a CPS may generate and propagate exception-path routing rules (EPRRs) for use by FPNs processing packets of applications which have distinct IVNIs and EVNIs (element 1313). A given EPRR may include a mapping between a flow key and an IEC (to which an EVNI of the application is mapped), indicating that flow state information for flows with that key is to be generated and replicated at that IEC.

The CPSs may monitor various metrics of the FPNs and the IECs over time (element 1316). As and when needed, the CPSs may initiate re-configuration actions to balance or manage the workload of the FPNs and IECs, such as modifying the mappings between flow keys and VNIs/IECs, adding nodes to IECs or to FPN groups assigned to an application, and so on. If such a re-configuration action is performed, a CPS may notify the affected PPS nodes, e.g., providing updated mappings, removing invalid mappings, etc.

Figure 14:
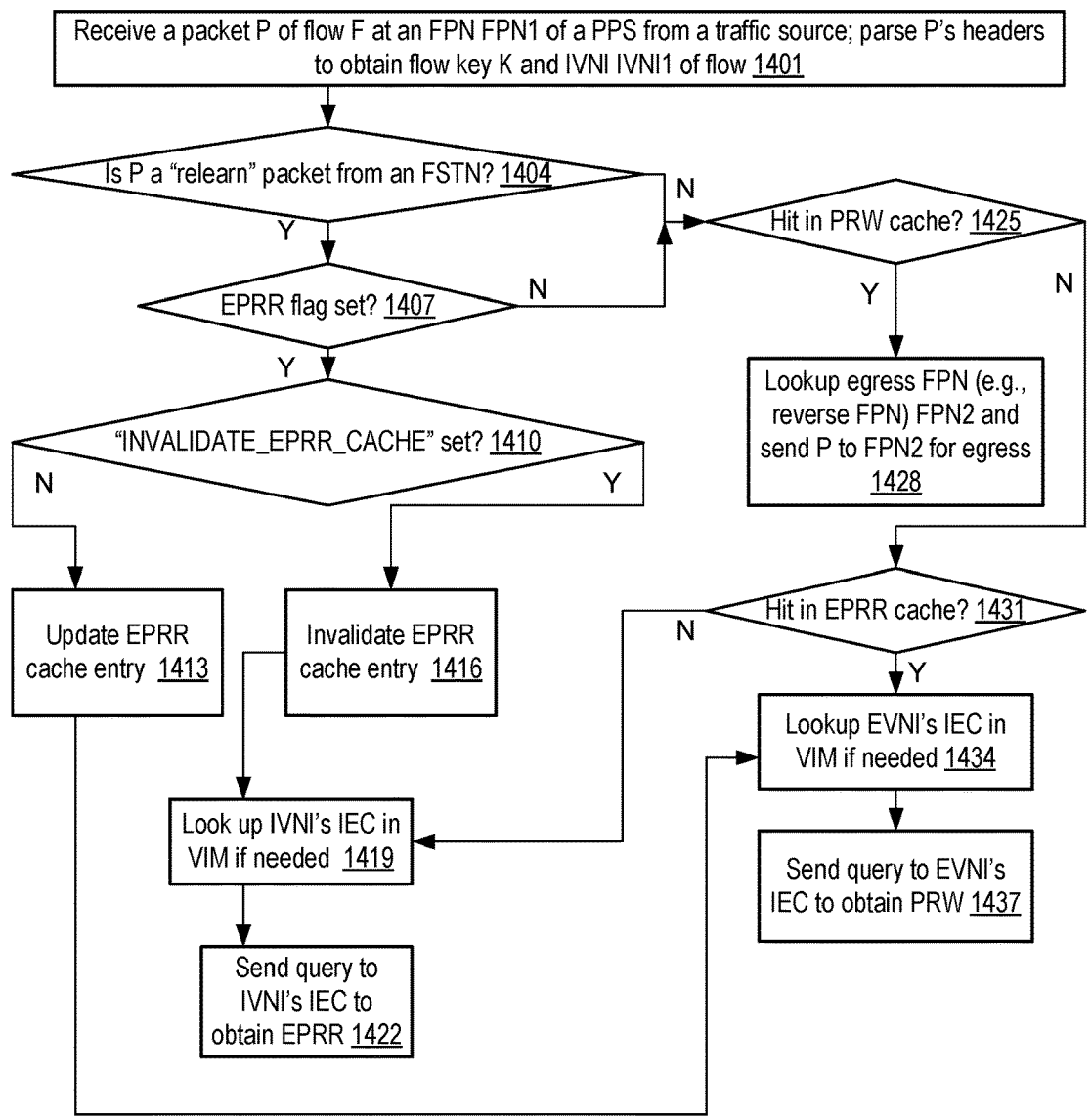
FIG. 14 is a flow diagram illustrating aspects of operations which may be performed by fast-path nodes of a packet processing application, according to at least some embodiments.

FIG. 14 is a flow diagram illustrating aspects of operations which may be performed by fast-path nodes of a packet processing application, according to at least some embodiments. A packet P of a flow F may be received from a traffic source at FPN FPN1 of a PPS similar in features and functionality to PPS 102 of FIG. 1 (element 1401). P's headers may be examined and parsed to obtain the flow key K of F. The headers may also indicated (e.g., via the destination IP address) the IVNI for the flow.

In the embodiment depicted in FIG. 14, the FPN may determine whether P is a "relearn" packet sent by an FSTN to provide information about EPRRs to the FPN. AN indication as to whether the packet is a relearn packet may be provided via a header of an encapsulation protocol used by the FSTN to send packets to the FPN in at least some embodiments. If P is not a "relearn" packet, as determined in operations corresponding to element 1404, a flow key based lookup may be conducted in FPN1's PRW cache. If a cache hit occurs (i.e., a relevant packet rewriting rule is found) (as determined in element 1425) and the cached PRW indicates the EVNI for the packet, the FPN may look up an egress FPN (e.g., a reverse FPN with respect to the direction in which P is flowing) FPN2, and send P to FPN2 for egress (sending the rewritten version of the packet to a destination in accordance with the PRW) in some embodiments (element 1428).

If there is a miss in the PRW cache (as also determined in operations corresponding to element 1425), a lookup may be conducted in FPN1's EPRR cache. If there is a hit in the EPRR cache (as determined in element 1431), FPN1 may look up the EVNI's IEC in a VIM if needed (element 1434). Note that in some implementations the EPRR may itself indicate the IEC of the EVNI, so such a lookup may not be needed. A query may be sent to an FSTN within the IEC to which the EVNI is mapped to obtain a PRW for P (element 1437).

In operations corresponding to element 1431, if a miss occurs in the EPRR cache, FPN1 may look up the IVNI's IEC (i.e., the IEC to which the IVNI indicated by the destination IP address in P is mapped) if needed (element 1419). A query may then be sent to an FSTN within the IVNI's IEC to obtain an EPRR for the flow F in at least some embodiments (element 1422).

In operations corresponding to element 1404, in some cases FPN1 may determine that P is in fact a relearn packet sent by an FSTN. In such a scenario, FPN1 may inspect the encapsulation packet headers (generated for P at the FSTN layer) to determine whether a special flag called an EPRR flag is set (element 1407). If the EPRR flag is not set, operations corresponding to element 1425 onwards may be performed in the depicted embodiment. In at least some embodiments, if the packet P is a relearn packet and it does not have the EPRR flag set, then P's encapsulation headers may include a PRW sent by an FSTN, and the received PRW may be stored in the PRW cache after the check for the EPRR flag in element 1407 is completed and before the lookup in the PRW cache (corresponding to element 1425) is performed.

If FPN1 determines, in operations corresponding to element 1407, that the EPRR flag is set, this may indicate that an FSTN is either trying to send an EPRR to FPN1, or trying to have an EPRR cache entry invalidated at FPN1. If the encapsulation headers include an INVALIDATE_ EPRR_CACHE flag set to true, as determined in operations corresponding to element 1410, FPN1 may look up and invalidate an EPRR cache entry for flow key K (element 1416) in the depicted embodiment. FPN1 may then perform operations corresponding to elements 1419 and 1422. In contrast, if INVALIDATE_EPRR_CACHE is not set, FPN1 may update or create an EPRR cache entry using an EPRR sent by the FSTN (element 1413). After the received EPRR has been stored in the cache, operations corresponding to elements 1434 and 1437 may be conducted in the depicted embodiment. Note that the flow diagram shown in FIG. 14 does not assume anything about the directionality of P (whether it is a forward direction packet or a reverse direction packet); the combination of operations shown in FIG. 14 may be able to handle both directions in various embodiments.

Figure 15:
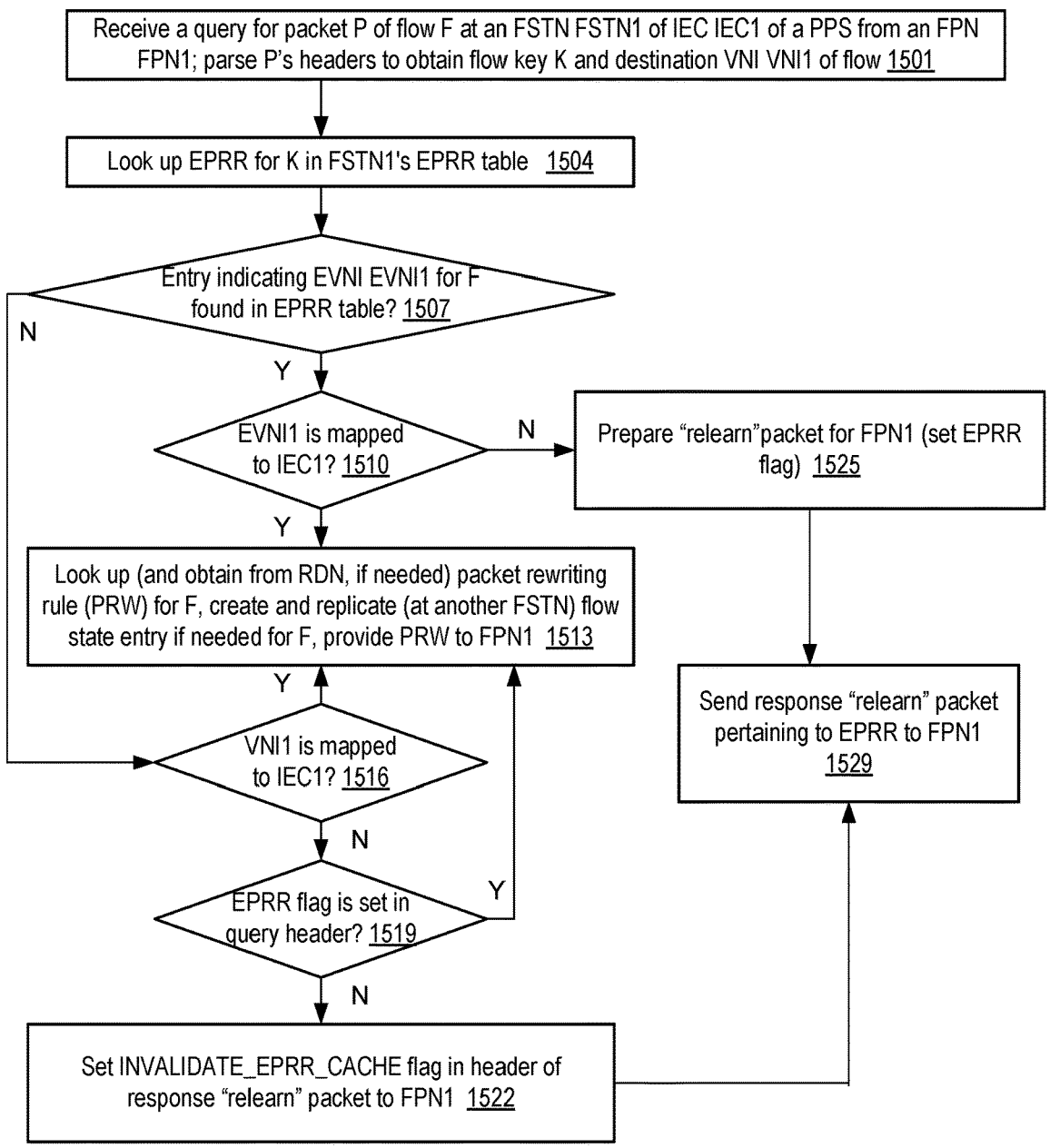
FIG. 15 is a flow diagram illustrating aspects of operations which may be performed by flow state tracker nodes of a packet processing application in response to a query from a fast-path node, according to at least some embodiments.

FIG. 15 is a flow diagram illustrating aspects of operations which may be performed by flow state tracker nodes of a packet processing application in response to a query from a fast-path node, according to at least some embodiments. Such queries may be sent from the FPNs in response to cache misses at the PRW caches and/or the EPRR caches maintained by the FPNs in various embodiments. A query comprising a packet P of a flow F may be received, from an FPN FPN1, at an FSTN FSTN1 of an IEC IEC1 of a PPS similar in functionality to PPS 102 of FIG. 1 in the depicted embodiment (element 1501). The packet's headers may be examined and parsed to obtain a flow key K and the destination VNI VNI1 of the packet (which may be the IVNI in the case of a forward-direction packet).

A lookup for an EPRR corresponding to flow key K may be conducted in FSTN1's EPRR table (which may have been populated with EPRRs sent from the PPS control plane (element 1504). If such an EPRR is found in the EPRR table, and it indicates an EVNI EVNI1 for the flow F (as determined in operations corresponding to element 1507), FSTN1 may determine whether EVNI1 is mapped to IEC1 (e.g., by consulting a set of VIMs provided to FSTN1 by the PPS control plane earlier).

If EVNI1 is mapped to IEC1 (as determined in operations corresponding to element 1510), FSTN1 may perform its normal flow state management tasks (tasks which do not utilize or access EPRRs) (element 1513) in various embodiments. For example, FSTN1 may look up (using flow key K) a PRW for F in a local cache, obtain the PRW from an RDN of IEC1 if needed, create and replicate a flow state entry for F if one does not already exist, and cause the PRW to be provided to FPN1.

If EVNI1 is not mapped to IEC1, as may also be determined in operations corresponding to element 1510, FSTN1 may prepare a relearn packet for FPN1, with its EPRR flag set (element 1525), and send that relearn packet to FPN1 with the EPRR in the relearn packet (element 1529).

It may be the case that operations corresponding to element 1507 indicate that there is no entry for F in the EPRR table of FSTN1. In this scenario, FSTN1 may determine whether the destination VNI VNI1 of P is mapped to IEC1 (element 1516). If VNI1 is indeed mapped to IEC1, or if the EPRR flag is set in the query header (as determined in element 1519), the normal flow state management operations corresponding to element 1513 may be performed by FSTN1. Note that at least in some embodiments, if an FPN receives a packet with the EPRR flag set from an FSTN in response to a query, and the FPN then has to send a second query to a different FSTN for the same flow, the EPRR flag may remain set in the second query.

If VNI1 is not mapped to IEC1 (as determined in operations corresponding to element 1516), and the EPRR flag is not set, this may indicate that an EPRR cache invalidation may be required in various embodiments. Accordingly, the INVALIDATE_EPRR-CACHE flag may be set in the header of the response relearn packet (element 1522), and the response relearn packet may be sent to FPN1 in the depicted embodiment. Note that in general, FSTNs may also perform other types of tasks than handling queries from FPNs, such as periodically synchronizing flow state entries with other FSTNs, receiving responses or queries from RDNs, participating in workload migration workflows, and so on, which are not shown in FIG. 15. It is also noted that in various embodiments, some of the operations shown in the flow diagrams of FIG. 13, FIG. 14 and/or FIG. 15 may be implemented in a different order than that shown in the figure, or may be performed in parallel rather than sequentially. Additionally, some of the operations shown in FIG. 13, FIG. 14 and/or FIG. 15 may not be required in one or more implementations.

Figure 16:
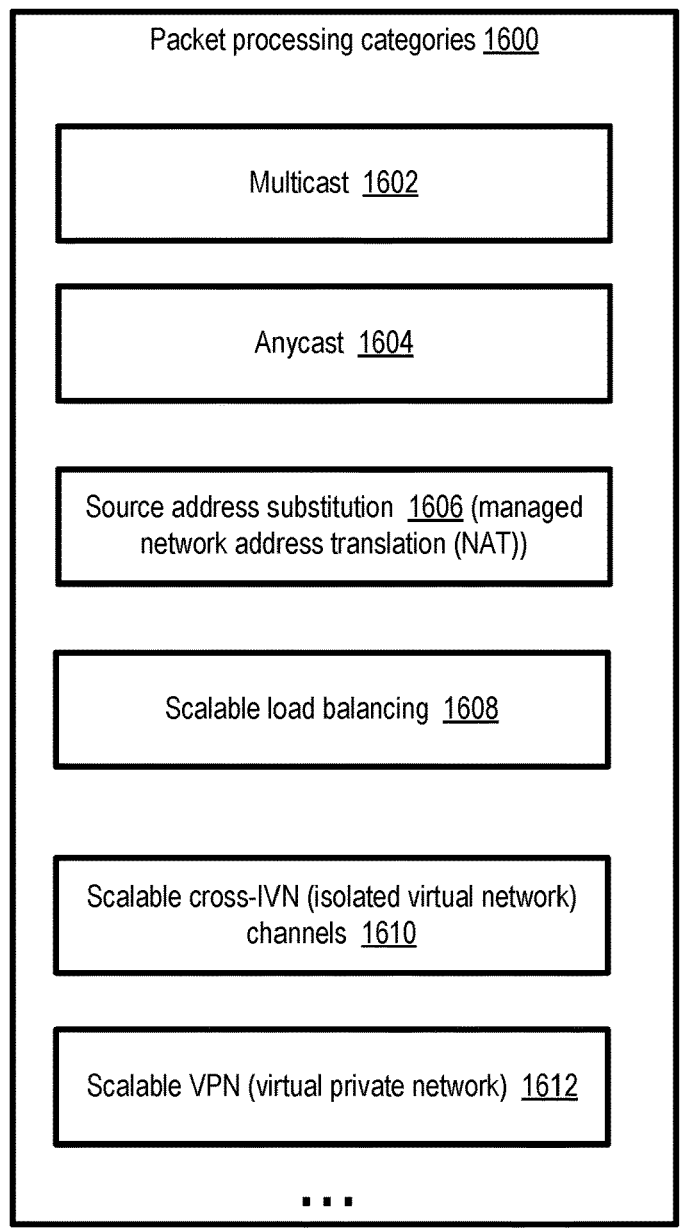
FIG. 16 illustrates example categories of packet processing that may be supported at a packet processing service of a cloud provider network, according to at least some embodiments.

FIG. 16 illustrates example categories of packet processing that may be supported at a packet processing service of a cloud provider network, according to at least some embodiments. As shown, the supported packet processing categories 1600 in the depicted embodiment may include, for example, multicast 1602, anycast 1604, source address substitution 1606 (which may also be referred to as managed network address translation (managed NAT)), scalable load balancing 1608, scalable cross-IVN channels 1610, scalable VPN (virtual private network) 1612 and the like. Other types of packet processing applications may be supported in various embodiments. In general, a PPS similar in features and functionality to PPS 102 of FIG. 1 may be configurable to implement any desired type of packet transformations, with nodes being assignable dynamically at each layer to support a large range of traffic rates in a transparent and scalable manner.

Generally speaking, multicast is a networking technique in which contents (e.g., the body) of a single packet sent from a source are replicated to multiple destinations of a specified multicast group. In contrast, stateful anycast may involve selecting, for all the packets of a given flow that are received at the PPS, a particular destination from among a specified set of destinations (e.g., regardless of workload level changes). Source address substitution, as the name suggests, involves replacing, for the packets of a particular flow, the source address and port in a consistent manner. Fixed-IP-address load balancing operations supported at a PPS may allow a particular IP address (e.g., an address assigned to an IVNI or an EVNI) to continue to be used as a load balancer address for an application, despite replacements of the virtual and/or physical machines being used for the load balancer.

In some embodiments, as indicated earlier, the PPS may be implemented at a provider network in which isolated virtual networks (IVNs) can be established. At least in some embodiments, by default the set of private network addresses set up within one IVN may not be accessible from another IVN. In various embodiments, the PPS may act as intermediary or channel between the private address spaces of two or more different IVNs, in effect setting up scalable and secure cross-IVN channels 1610. In at least some embodiments, the PPS may also or instead be used to support scalable VPN connectivity between some set of resources within a cloud provider network and one or more client networks or client premises outside the provider network.

Figure 17:
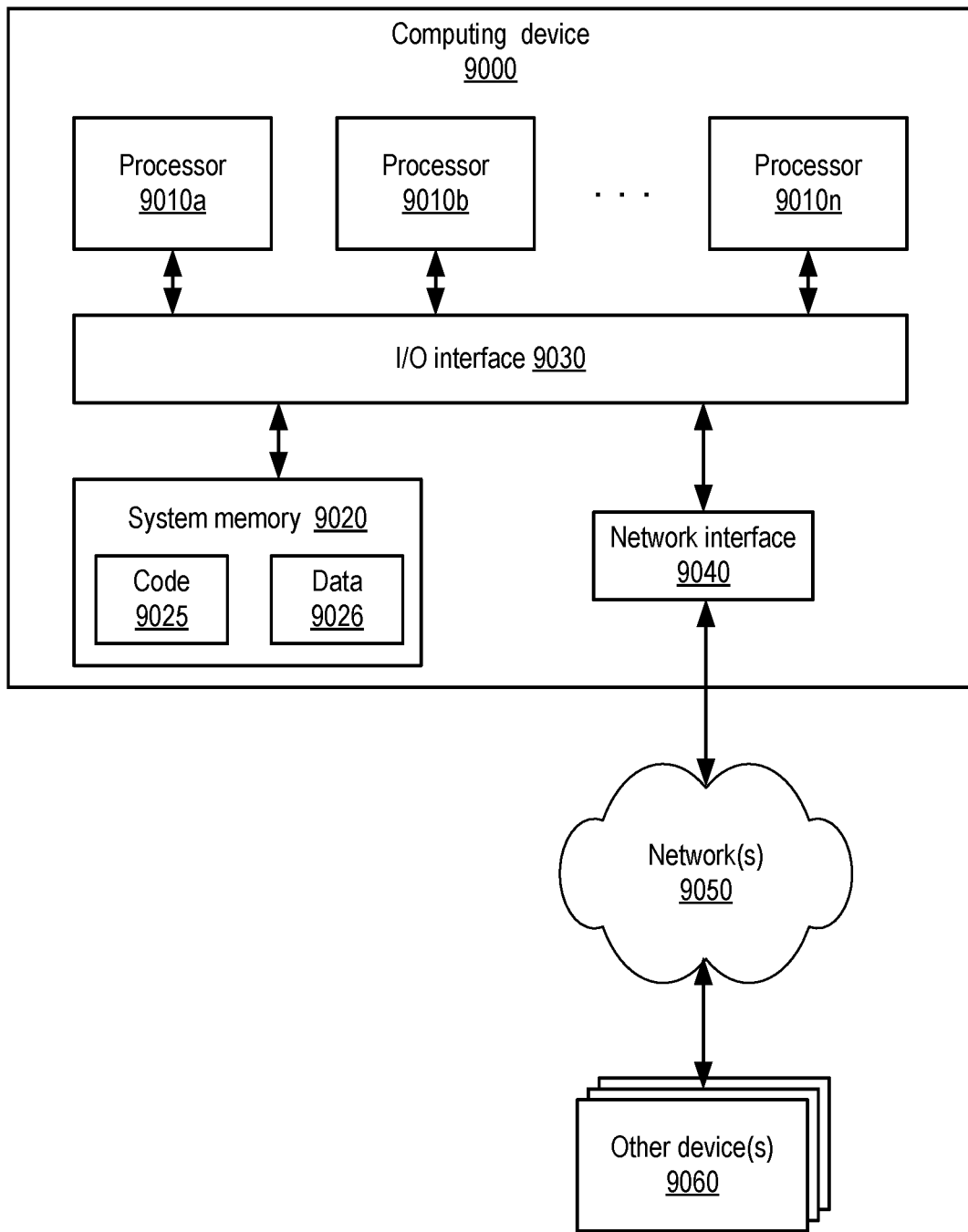
FIG. 17 is a block diagram illustrating an example computing device that may be used in at least some embodiments.

In at least some embodiments, a server that implements the types of techniques described herein (e.g., including functionality of PPS control plane servers, FPNs, FSTNs, RDNs and/or components of other provider network services), may include a general-purpose computer system that includes or is configured to access one or more computer-accessible media. FIG. 17 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 16, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 16. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of fast-path nodes of a packet processing service of a cloud computing environment, including a first fast-path node and a second fast-path node, wherein individual ones of the plurality of fast-path nodes are configured to cache and execute packet rewriting rules;
wherein the first fast-path node is configured to:
receive a first packet of a first forward-direction packet flow of a networking application, wherein the first packet indicates a particular ingress virtual network interface which is configured to receive network packets originating at a set of traffic sources of the networking application;
select, as a destination for a first query for an exception-path routing rule for the first forward-direction packet flow, a first exception-path cell of a plurality of exception-path cells of the packet processing service, wherein individual ones of the exception-path cells are configured to store flow state information and generate packet rewriting rules, and wherein the first exception-path cell is selected based at least in part on a first mapping which indicates that the particular ingress virtual network interface is mapped to the first exception-path cell;
obtain, from the first exception-path cell in response to the first query, a first exception-path routing rule which indicates that at least a portion of flow state information of the first forward-direction packet flow is to be stored within an exception-path cell to which a particular egress virtual network interface of the networking application is mapped;
transmit, in accordance with the first exception-path routing rule, a second query for a packet rewriting rule to a second exception-path cell of the plurality of exception-path cells, wherein the second exception-path cell is selected as the destination for the second query based at least in part on a second mapping, wherein the second mapping indicates that the particular egress virtual network interface is mapped to the second exception-path cell; and
transmit the first packet to a second fast-path node of the plurality of fast-path nodes, wherein the second fast-path node is selected as the destination for the first packet based at least in part on an identifier of the particular egress virtual network interface; and wherein the second fast-path node is configured to:
 transmit a rewritten version of the first packet to a particular networking destination of a set of destinations of the networking application, wherein the rewritten version is generated in accordance with a first packet rewriting rule obtained from the second exception-path cell.

2. The system as recited in claim 1, wherein the first forward-direction packet flow utilizes a first network connection, and wherein the first fast-path node is further configured to:
 in response to obtaining the first exception-path routing rule from the first exception-path cell, store the first exception-path routing rule in a cache; and
 utilize a cached version of the first exception-path routing rule, obtained from the cache, to route a third query for a second packet rewriting rule for a second forward-direction packet flow utilizing a second network connection, without transmitting another query for an exception-path routing rule to an exception-path cell.

3. The system as recited in claim 1, further comprising a control plane server of the packet processing service, wherein the control plane server is configured to:
 determine that a criterion for mapping the particular egress virtual network interface to a third exception-path cell instead of the second exception-path cell has been satisfied;
 cause the first exception-path routing rule to be invalidated; and
 cause a second exception-path routing rule to be propagated to one or more nodes of the packet processing service, wherein the second exception-path routing rule indicates that at least a portion of flow state information of an additional forward-direction packet flow directed to the particular ingress virtual network interface is to be stored within the third exception-path cell.

4. The system as recited in claim 3, wherein to determine that the criterion has been satisfied, the control plane server is further configured to:
 analyze one or more of: (a) performance metrics of one or more exception-path cells including the second exception-path cell or (b) failure metrics of one or more exception-path cells including the second exception-path cell.

5. The system as recited in claim 1, wherein the first fast-path node is implemented at least in part at a virtual machine of a virtualized computing service of the cloud computing environment.

6. A computer-implemented method, comprising:
 receiving, at a first fast-path node of a plurality of fast-path nodes of a packet processing service, a first packet of a first forward-direction packet flow of a networking application, wherein the first packet identifies an ingress virtual network interface configured for receiving packets of the first forward-direction packet flow from a set of traffic sources of the networking application;
 selecting, by the first fast-path node as a destination for a first query associated with the first forward-direction packet flow, a first exception-path cell of a plurality of exception-path cells of the packet processing service, wherein the first exception-path cell is selected based at least in part on a first mapping of the ingress virtual network interface to the first exception-path cell;
 obtaining, by the first fast-path node, from the first exception-path cell in response to the first query, a first exception-path routing rule which indicates that at least a portion of flow state information of the first forward-direction packet flow is to be stored within an exception-path cell to which an egress virtual network interface of the first networking application is mapped;
 transmitting, by the first fast-path node in accordance with the first exception-path routing rule, a second query to a second exception-path cell of the plurality of exception-path cells, wherein the second exception-path cell is selected as the destination for the second query based at least in part on a second mapping between the egress virtual network interface and the second exception-path cell;
 transmitting, by the first fast-path node, the first packet to a second fast-path node of the plurality of fast-path nodes; and
 transmitting, by the second fast-path node, a rewritten version of the first packet to a particular destination of a set of destinations of the networking application, wherein the rewritten version is generated in accordance with a first packet rewriting rule generated at the second exception-path cell in response to the second query.

7. The computer-implemented method as recited in claim 6, wherein the first forward-direction packet flow utilizes a first network connection, the computer-implemented method further comprising:
 in response to receiving the first exception-path routing rule from the first exception-path cell, storing, by the first fast-path node, the first exception-path routing rule in a cache; and
 using, by the first fast-path node, a cached version of the first exception-path routing rule, obtained from the cache, to route a third query associated with a second forward-direction packet flow which utilizes a second network connection.

8. The computer-implemented method as recited in claim 7, further comprising:
 refreshing, by the first fast-path node, in response to receiving a packet of the second forward-direction packet flow, a time-to-live setting of a cache entry within which the cached version of the first exception-path routing rule is stored, wherein the time-to-live setting is utilized to select cache entries for replacement from the cache.

9. The computer-implemented method as recited in claim 6, further comprising:
 determining, at a control plane server of the packet processing service, that a criterion for mapping the egress virtual network interface to a third exception-path cell instead of the second exception-path cell has been satisfied;
 causing, by the control plane server, the first exception-path routing rule to be invalidated; and
 causing, by the control plane server, a second exception-path routing rule to be propagated to one or more nodes of the packet processing service, wherein the second exception-path routing rule indicates that at least a portion of flow state information of an additional forward-direction packet flow directed to the ingress virtual network interface is to be stored within the third exception-path cell.

10. The computer-implemented method as recited in claim 9, further comprising:
 analyzing, by the control plane server, one or more of: (a) performance metrics of one or more exception-path cells including the second exception-path cell or (b)

failure metrics of one or more exception-path cells including the second exception-path cell, wherein determining that the criterion has been satisfied is based at least in part on said analyzing.

11. The computer-implemented method as recited in claim 6, further comprising:
generating, at a control plane server of the packet processing service in response to programmatic input from a customer of the packet processing service, the first exception-path routing rule; and
propagating, by the control plane server, the first exception-path routing rule to one or more exception-path nodes of the first exception-path cell.

12. The computer-implemented method as recited in claim 6, further comprising:
receiving, by a first exception-path node of the second exception-path cell from the first fast-path node, the second query; and
in response to said receiving the second query,
initializing, by the first exception-path node, a flow state entry for the first forward-direction packet flow; and
causing, by the first exception-path node, the flow state entry for the first forward-direction packet flow to be replicated at a second exception-path node of the second exception-path cell.

13. The computer-implemented method as recited in claim 6, further comprising:
receiving, at the second fast-path node, a first packet of a first reverse-direction packet flow corresponding to the first forward-direction packet flow, wherein the first packet of the first reverse-direction packet flow indicates the egress virtual network interface configured for receiving packets of the first reverse-direction packet flow from the set of traffic destinations;
selecting, by the second fast-path node as a destination for a second query for an exception-path routing rule for the first reverse-direction packet flow, the second exception-path cell, wherein the second exception-path cell is selected based at least in part on the second mapping of the egress virtual network interface to the second exception-path cell; and
in response to determining, at the second exception-path cell, that an exception-path routing rule for the first reverse-direction packet flow is not available, initiating a lookup for a packet rewriting rule for the first reverse-direction packet flow at the second exception-path cell.

14. The computer-implemented method as recited in claim 13, further comprising:
in response to determining, at the second exception-path cell, that a second packet rewriting rule has been found for the first reverse-direction packet flow, transmitting the second packet rewriting rule to the second fast-path node from the second exception-path cell.

15. The computer-implemented method as recited in claim 6, further comprising:
in response to receiving the first packet rewriting rule from the second exception-path cell, storing, by the first fast-path node, the first packet rewriting rule in a cache; and
using, by the first fast-path node, a cached version of the first packet rewriting rule, obtained from the cache, to process an additional packet of the first forward-direction packet flow without communicating with an exception-path node.

16. A non-transitory computer-accessible storage medium storing program instructions that when executed on a processor implement a first fast-path node of a plurality of fast-path nodes of a packet processing service, wherein the first fast-path node is configured to:
receive a first packet of a first forward-direction packet flow of a networking application from a traffic source via an ingress virtual network interface of the networking application;
obtain, from an exception-path routing information source, a first exception-path routing rule which indicates that at least a portion of flow state information of the first forward-direction packet flow is to be stored within an exception-path cell to which an egress virtual network interface of the first networking application is mapped;
transmit, in accordance with the first exception-path routing rule, a particular query to a particular exception-path cell of a plurality of exception-path cells of the packet processing service, wherein the particular exception-path cell comprises a set of exception-path nodes, wherein the particular exception-path cell is selected as a destination for the particular query based at least in part on a mapping between the egress virtual network interface and the particular exception-path cell, and wherein flow state information of the first forward-direction packet flow is stored at the particular exception-path cell based at least in part on the particular query; and
transmit the first packet to a second fast-path node of the plurality of fast-path nodes, wherein the second fast-path node transmits a rewritten version of the first packet to a particular destination of a set of destinations of the networking application, wherein the rewritten version is generated in accordance with a first packet rewriting rule generated at the particular exception-path cell in response to the particular query.

17. The non-transitory computer-accessible storage medium as recited in claim 16, wherein the exception-path routing information source is an exception-path node of the packet processing service.

18. The non-transitory computer-accessible storage medium as recited in claim 16, wherein the exception-path routing information source is a control plane server of the packet processing service.

19. The non-transitory computer-accessible storage medium as recited in claim 16, wherein the first forward-direction packet flow utilizes a first network connection, wherein the first fast-path node is further configured to:
in response to obtaining the first exception-path routing rule from the exception-path routing information source, store the first exception-path routing rule in a cache; and
utilize a cached version of the first exception-path routing rule, obtained from the cache, to route a second query for a packet rewriting rule for a second forward-direction packet flow which utilizes a second network connection.

20. The non-transitory computer-accessible storage medium as recited in claim 16, wherein the first fast-path node is further configured to:
obtain, from a control plane server of the packet processing service, a set of mappings between virtual network interfaces and isolated exception-path cells, wherein the set of mappings includes the mapping between the egress virtual network interface and the particular exception-path cell.

* * * * *